US011410580B2

(12) United States Patent
Buckley et al.

(10) Patent No.: US 11,410,580 B2
(45) Date of Patent: Aug. 9, 2022

(54) DISPLAY NON-UNIFORMITY CORRECTION

(71) Applicant: Facebook Technologies, LLC, Menlo Park, CA (US)

(72) Inventors: Edward Buckley, Redmond, WA (US); Michael Yee, Kirkland, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 50 days.

(21) Appl. No.: 16/998,916

(22) Filed: Aug. 20, 2020

(65) Prior Publication Data
US 2022/0058997 A1 Feb. 24, 2022

(51) Int. Cl.
*G09G 3/00* (2006.01)
*G02B 27/01* (2006.01)
*G09G 3/20* (2006.01)

(52) U.S. Cl.
CPC ......... *G09G 3/002* (2013.01); *G02B 27/0172* (2013.01); *G02B 27/0176* (2013.01); *G09G 3/2003* (2013.01); *G09G 3/2044* (2013.01)

(58) Field of Classification Search
CPC .... G09G 3/002; G09G 3/2003; G09G 3/2044; G02B 27/0176; G02B 27/0172
See application file for complete search history.

(56) References Cited

U.S. PATENT DOCUMENTS

| 10,958,702 | B1 | 3/2021 | Yang et al. |
| 2007/0126657 | A1 | 6/2007 | Kimpe |
| 2009/0179824 | A1* | 7/2009 | Tsujimoto ............ G02B 27/017 345/7 |
| 2012/0019529 | A1 | 1/2012 | Kimpe |
| 2017/0161951 | A1 | 6/2017 | Fix et al. |
| 2018/0314324 | A1 | 11/2018 | Abed Aljawad et al. |
| 2019/0227319 | A1 | 7/2019 | Trail et al. |

(Continued)

FOREIGN PATENT DOCUMENTS

EP   3585003 A1   12/2019

OTHER PUBLICATIONS

International Search report and Written Opinion for International Application No. PCT/US2021/044045, dated Nov. 8, 2021, 14 pages.

(Continued)

*Primary Examiner* — Alexander Eisen
*Assistant Examiner* — Kebede T Teshome
(74) *Attorney, Agent, or Firm* — Baker Botts L.L.P.

(57) ABSTRACT

In one embodiment, a computing system may access a first mask associated with a first color component and a first pixel in an image, and a second mask associated with a second color component and a second pixel in the image. The system may access first component values of the first color component in a first pixel region containing the first pixel, and second component values of the second color component in a second pixel region containing the second pixel. The system may modify the first component values using the first mask, and the second component values using the second mask. The system may cause the modified first and second component values to be displayed by light-emitting elements of the first and second color components. The first and second masks may be generated based on relative positions of the first light-emitting elements and the second light-emitting elements.

19 Claims, 21 Drawing Sheets

(56) References Cited

U.S. PATENT DOCUMENTS

2019/0250409 A1    8/2019  Stafford et al.
2021/0191319 A1    6/2021  Christmas

OTHER PUBLICATIONS

Kimpe T., et al., "Human Vision-Based Algorithm to Hide Defective Pixels in LCDs," Proceedings of SPIE, IEEE, US, Feb. 2006, vol. 6057, Art No. 6057N, 10 pages, XP007904155.

* cited by examiner

510A

| -0.0062 | -0.0079 | -0.0759 | -0.0079 | -0.0062 |
|---|---|---|---|---|
| -0.0128 | 0.0266 | 0.1561 | 0.0266 | -0.0128 |
| 0.0136 | -0.1029 | 0 | -0.1029 | 0.0136 |
| -0.0128 | 0.0266 | 0.1561 | 0.0266 | -0.0128 |
| -0.0062 | -0.0079 | -0.0759 | -0.0079 | -0.0062 |

510B

| -0.1138 | 0.1590 | -0.1162 | 0.1590 | -0.1138 |
|---|---|---|---|---|
| 0.1566 | -0.1446 | -0.1998 | -0.1446 | 0.1566 |
| -0.0959 | -0.2000 | 1 | -0.2000 | -0.0959 |
| 0.1566 | -0.1446 | -0.1998 | -0.1446 | 0.1566 |
| -0.1138 | 0.1590 | -0.1162 | 0.1590 | -0.1138 |

510C

| 0.0250 | -0.0523 | 0.0339 | -0.0523 | 0.0250 |
|---|---|---|---|---|
| -0.0757 | -0.0499 | 0.0961 | -0.0499 | -0.0757 |
| 0.1078 | 0.0385 | 0 | 0.0385 | 0.1078 |
| -0.0757 | -0.0499 | 0.0961 | -0.0499 | -0.0757 |
| 0.0250 | -0.0523 | 0.0339 | -0.0523 | 0.0250 |

| -0.1227 | 0.1932  | -0.1337 | 0.1932  | -0.1227 |
|---------|---------|---------|---------|---------|
| 0.2002  | -0.1933 | -0.1661 | -0.1993 | 0.2002  |
| -0.1222 | -0.1964 | 1       | -0.1964 | -0.1222 |
| 0.2002  | -0.1993 | -0.1661 | -0.1993 | 0.2002  |
| -0.1227 | 0.1932  | -0.1337 | 0.1932  | -0.1227 |

520B

| -0.0410 | 0.0536  | -0.0714 | 0.0536  | -0.0410 |
|---------|---------|---------|---------|---------|
| 0.0202  | -0.0515 | 0.0313  | -0.0515 | 0.0202  |
| -0.0402 | 0.0734  | 0       | 0.0734  | -0.0402 |
| 0.0202  | -0.0515 | 0.0313  | -0.0515 | 0.0202  |
| -0.0410 | 0.0536  | -0.0714 | 0.0536  | -0.0410 |

520C

| 0.0146  | -0.0780 | 0.1202  | -0.0780 | 0.0146  |
|---------|---------|---------|---------|---------|
| -0.0421 | -0.0191 | -0.0436 | -0.0191 | -0.0421 |
| 0.0097  | 0.1130  | 0       | 0.1130  | 0.0097  |
| -0.0421 | -0.0191 | -0.0436 | -0.0191 | -0.0421 |
| 0.0146  | -0.0780 | 0.1202  | -0.0780 | 0.0146  |

| 0.0185 | -0.0503 | 0.1168 | -0.0503 | 0.0185 |
|---|---|---|---|---|
| -0.0454 | -0.1176 | -0.0301 | -0.1176 | -0.0454 |
| 0.0392 | 0.2718 | 0 | 0.2718 | 0.0392 |
| -0.0454 | -0.1176 | -0.0301 | -0.1176 | -0.0454 |
| 0.0185 | -0.0503 | 0.1168 | -0.0503 | 0.0185 |

530B

| -0.0267 | 0.0155 | -0.0330 | 0.0155 | -0.0267 |
|---|---|---|---|---|
| -0.0015 | -0.0547 | 0.0777 | -0.0547 | -0.0015 |
| -0.0026 | 0.0651 | 0 | 0.0651 | -0.0026 |
| -0.0015 | -0.0547 | 0.0777 | -0.0547 | -0.0015 |
| -0.0267 | 0.0155 | -0.0330 | 0.0155 | -0.0267 |

530C

| 0.0479 | -0.1708 | 0.3167 | -0.1708 | 0.0479 |
|---|---|---|---|---|
| -0.0131 | -0.1693 | -0.1490 | -0.1693 | -0.0131 |
| 0.0941 | -0.1531 | 1 | -0.1531 | 0.0941 |
| -0.0131 | -0.1693 | -0.1490 | -0.1693 | -0.0131 |
| 0.0479 | -0.1708 | 0.3167 | -0.1708 | 0.0479 |

*FIG. 5D*

DISPLAY NON-UNIFORMITY CORRECTION

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for correcting dead pixels of displays using masks that are customized based on one or more pixel non-uniformity factors (e.g., pixel shapes, pixel sizes, rotation angles, pixel relative positions in associated pixel arrays, pixel visual positions in the viewer space, etc.). The system may have a display with three light-emitting element arrays (e.g., µLED arrays) for three color channels (e.g., RGB). Due to manufacturing inaccuracy, the pixels at the same visual locations (e.g., being close to each other within a threshold distance in the viewer space) may have different relative positions in respective pixel arrays (e.g., different row/column numbers in respective pixel arrays). For example, for a dead pixel in the red color channel, the pixels of the green and blue color channels that are at the same visual location to the red dead pixel (e.g., being close to the dead pixel in the viewer space) may be pixels of different column number or/and row number in their respective pixel arrays, with respect to each other or/and with respect to the red dead pixel in the red pixel array. For correcting dead pixels, the system may use one or more pixel correction masks to modify the pixel values in the image to be displayed to compensate the visual effect of the dead pixels of the display. The system may apply masks to pixels of the same visual location in the viewer space rather than pixels of the same relative pixel positions in respective pixel arrays. The system may determine the visual locations of the pixels based on optical measurements (e.g., images captured during the manufacturing stage). For example, the system may capture an image of the light-emitting element arrays (including the lenses above the light-emitting elements) and determine shapes, sizes, positions, rotation angles, and relative positions within associated pixel array in the viewer space and in light-emitting element array space based on the captured image(s). The system may determine, for each dead pixel of a particular color channel, the pixels of the other two color channels that are at the same visual location (e.g., within a threshold distance) with respect to the dead pixel and pixels of other two color channels that are within the mask region in the viewer space.

In particular embodiments, the system may generate a bitmap for each color channel to map the pixels to corresponding correction masks that need to be applied on these pixels. The bitmap may include a 2-bit mask indicator for each pixel to indicate whether or not a pixel correction mask need to be applied on that pixel and what type of pixel correction mask needs to be applied. For example, the mask indicator value may be set to: 0 for indicating that no correction mask is needed, 1 for indicating that a red pixel correction mask needs to be applied, 2 for indicating that a green pixel correction mask needs to be applied, and 3 for indicating that a blue pixel mask needs to be applied. As an example, for a red dead pixel, the associated mask indicator may be set to 1 for to indicate that a red pixel correction mask (for red color channel) needs to be applied on that pixel. The green and blue pixels that are at the same visual location with respect to the red dead pixel may have their mask indicators set to 1 to indicate that red pixel correction masks (for green and blue color channels) need to be applied on these pixels. At runtime, the system may access and check the mask indicator in the bitmap for each pixel of each color channel and apply an associated correction mask to that pixel if the mask indicator has a non-zero value. By applying correction masks based on the bitmap, the pixel correction masks may be applied to the pixels of the same visual locations in the viewer space and provide better compensated visual effect in spite of the pixel misalignment of different color channels of the display.

Because of optical distortion caused by lenses or waveguides, pixels at different locations in the viewer space as perceived by a viewer may have different shapes, sizes and angular distances to surrounding pixels. The system may customize the correction mask values based on pixel shapes, sizes, locations, or angular distances of the pixels in the viewer space. As an example, the system may generate a set of 5×5 pixel correction masks corresponding to a ring shape as determined based on the dead pixel location and its distances to surrounding pixels. The correction masks may be calculated directly using a function based on a number of input parameters (e.g., a dead pixel location in the viewer space, a color channel, row/column numbers of associated pixels of other color channels, pixel shapes, pixel sizes, pixel rotation angles, angular distances to surrounding pixels, etc.) using a firmware computation module at runtime (e.g., in real-time when the masks are needed). As another example, the system may pre-generate pixel correction masks for a number of locations corresponding to a mesh grid in the viewer space (e.g., a set of three correction masks for each grid point) and store the pre-generated correction masks in a database. At runtime, the system may determine multiple sets of correction masks (e.g., each set including three masks for RGB color channels) associated with the corners of a mesh region containing the dead pixel location. The system may interpolate the corresponding correction masks of the same color channel to generate the respective correction masks for that color channel for correcting the dead pixel. After the set of corrections masks being generated, the system may apply the correction masks to RGB color channels on the image pixels corresponding to the same visual location with respect to the dead pixel (e.g., based on the bitmaps). By generating and applying the correction masks based on the pixel locations in the viewer space, the system may provide better visual effect for the dead pixel correction in spite of the pixel misalignment and optical distortion.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5B illustrates an example array of scaling factors corresponding to the mask in FIG. 5A.

FIG. 5C illustrates example mask values for a set of three masks for correcting a red dead pixel.

FIG. 5D illustrates example mask values for a set of three masks for correcting a blue dead pixel.

DESCRIPTION OF EXAMPLE EMBODIMENTS

Figure 1A:
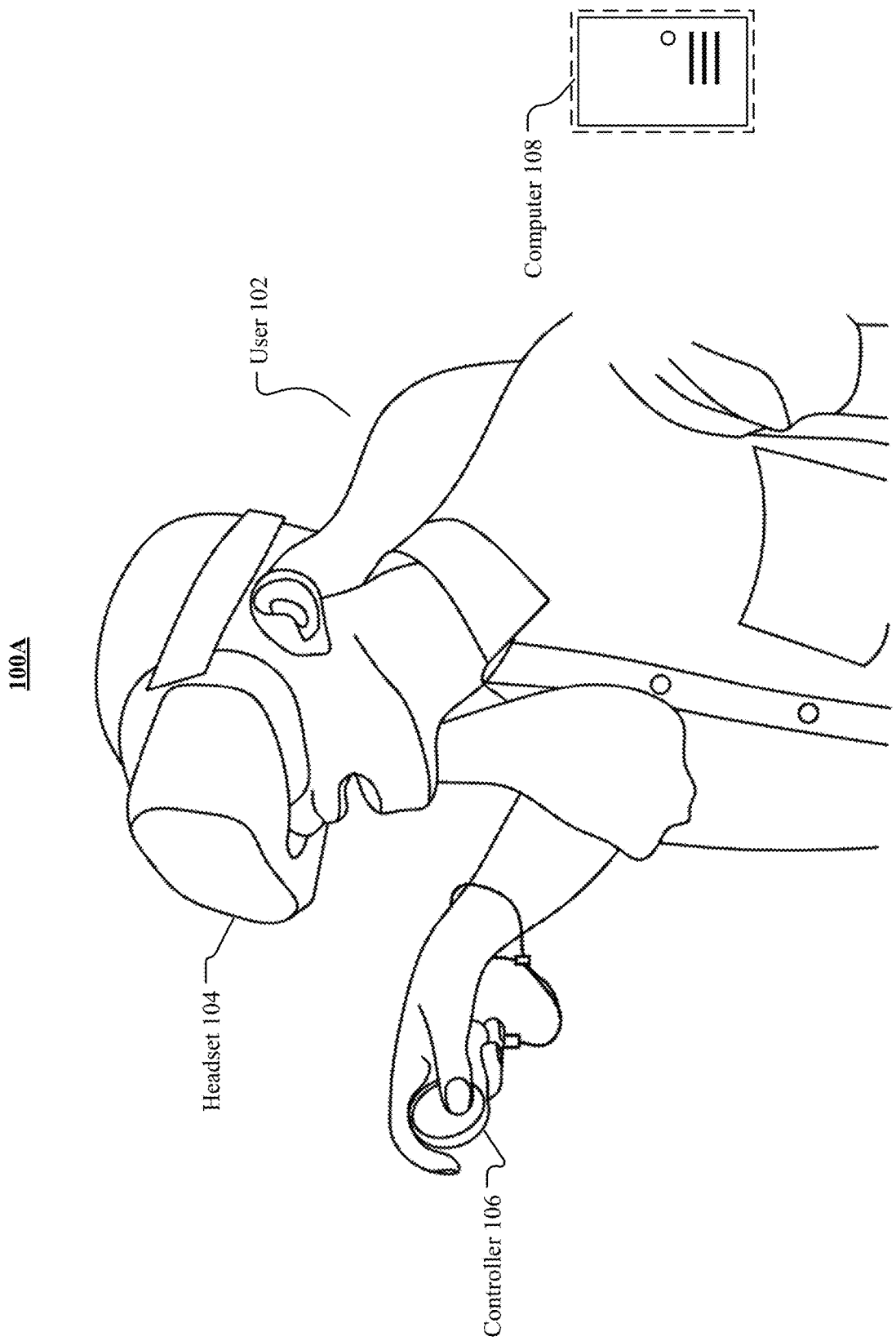
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
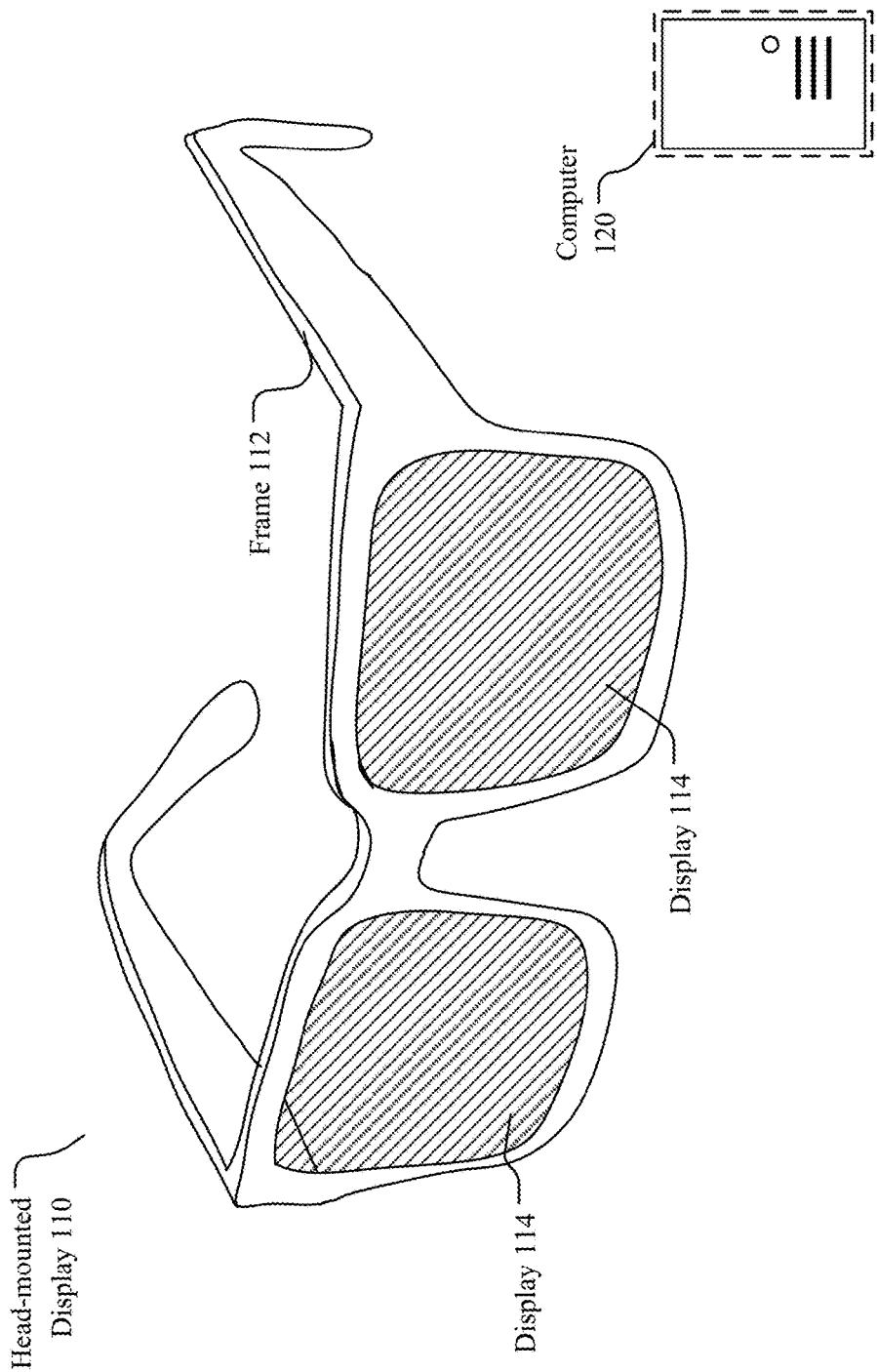
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
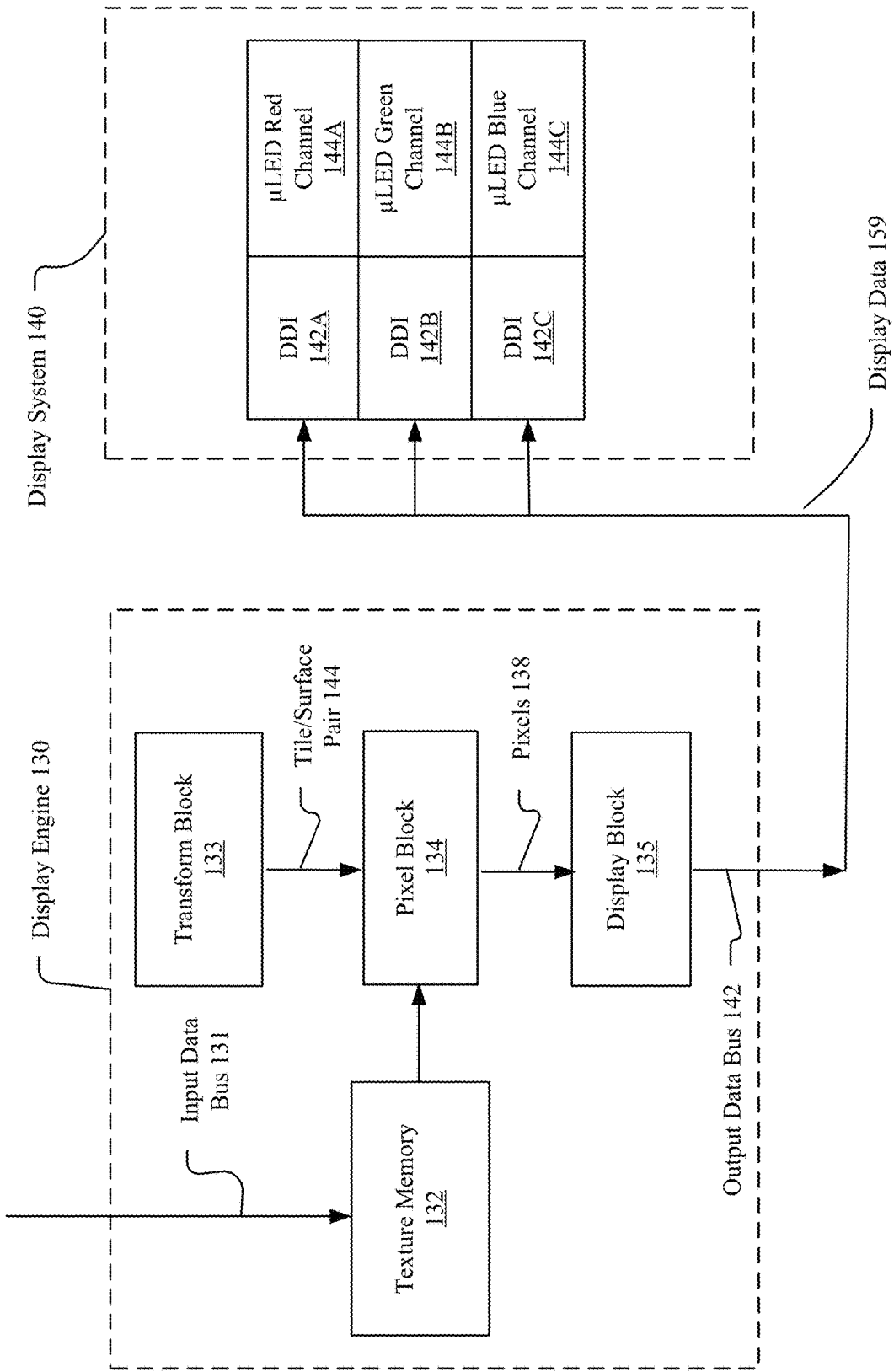
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (µLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), display degradation, etc. U.S. patent application Ser. No. 16/998,860, entitled "Display Degradation Compensation," first named inventor "Edward Buckley," filed on 20 Aug. 2020, which discloses example systems, methods, and processes for display degradation compensation, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
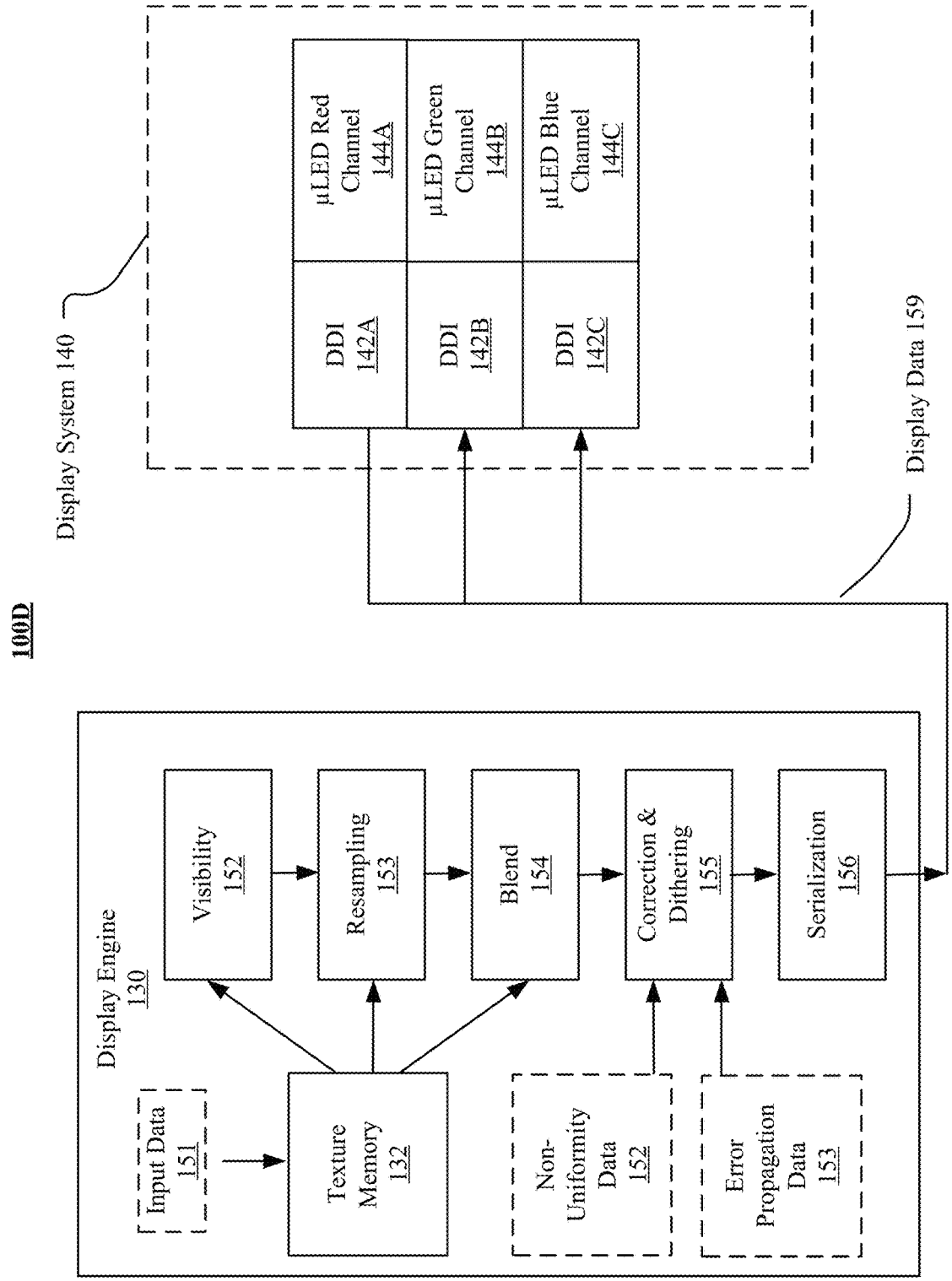
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
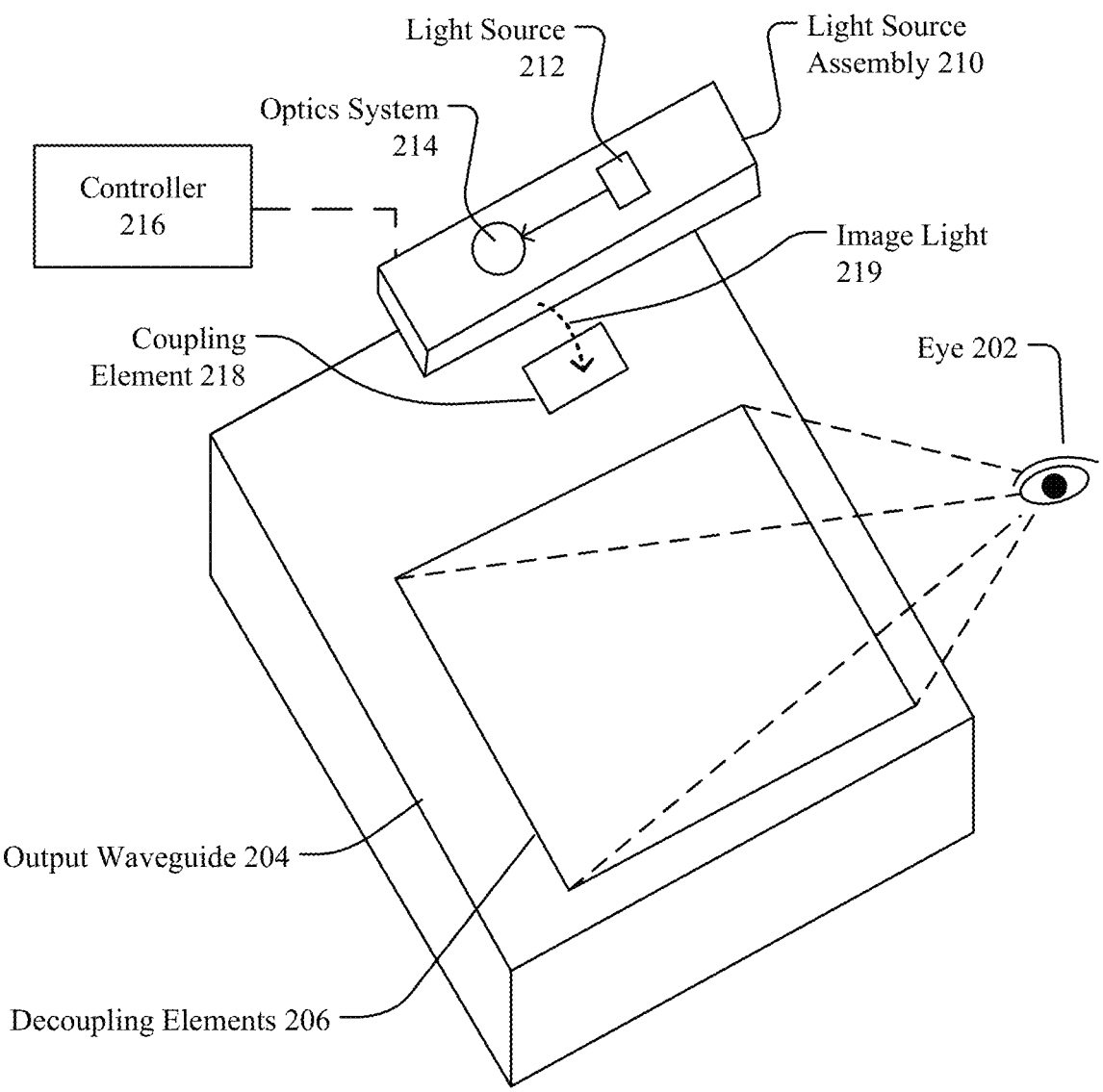
FIG. 2A illustrates an example scanning waveguide display.
Figure 3A:
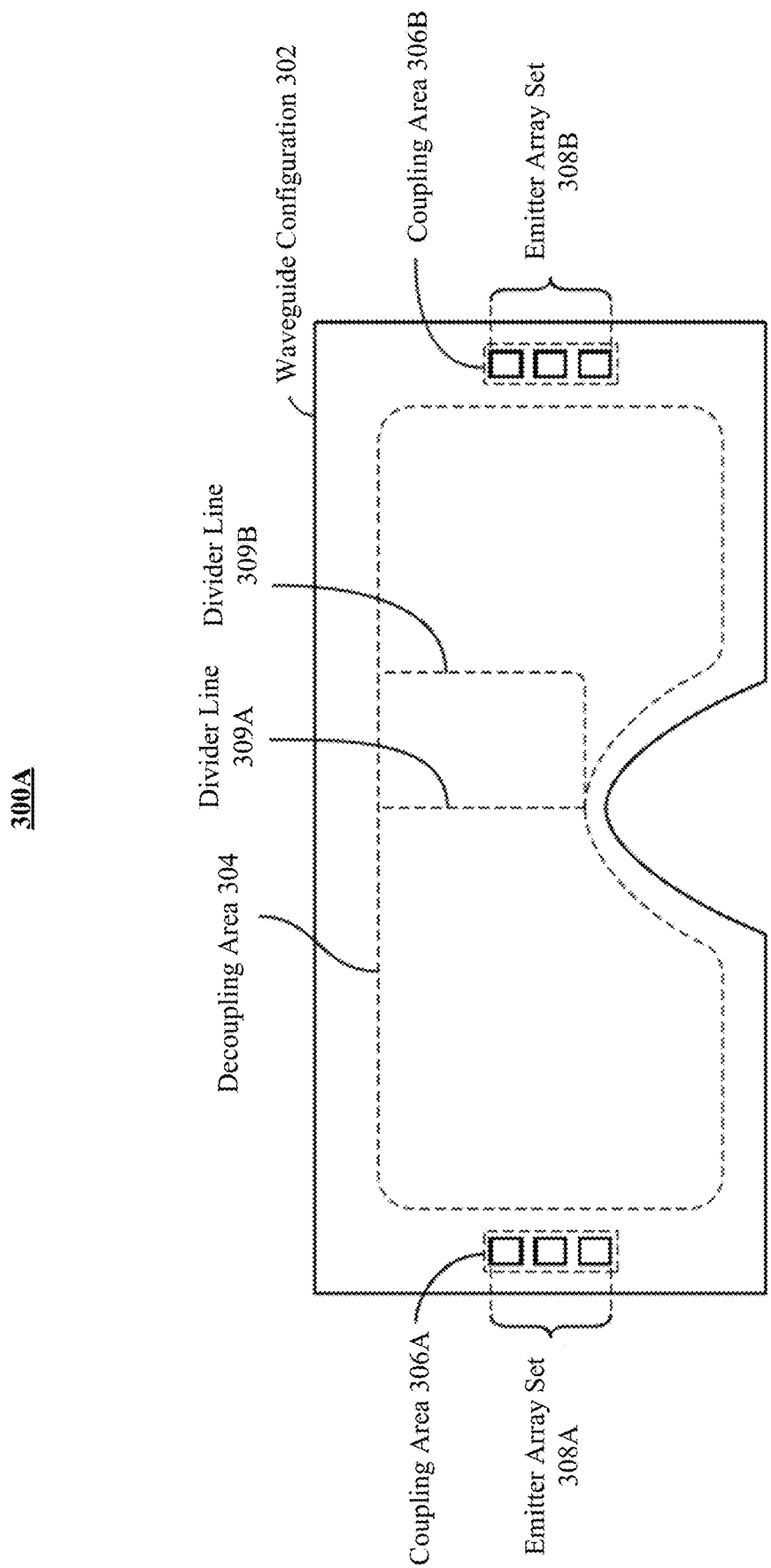
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
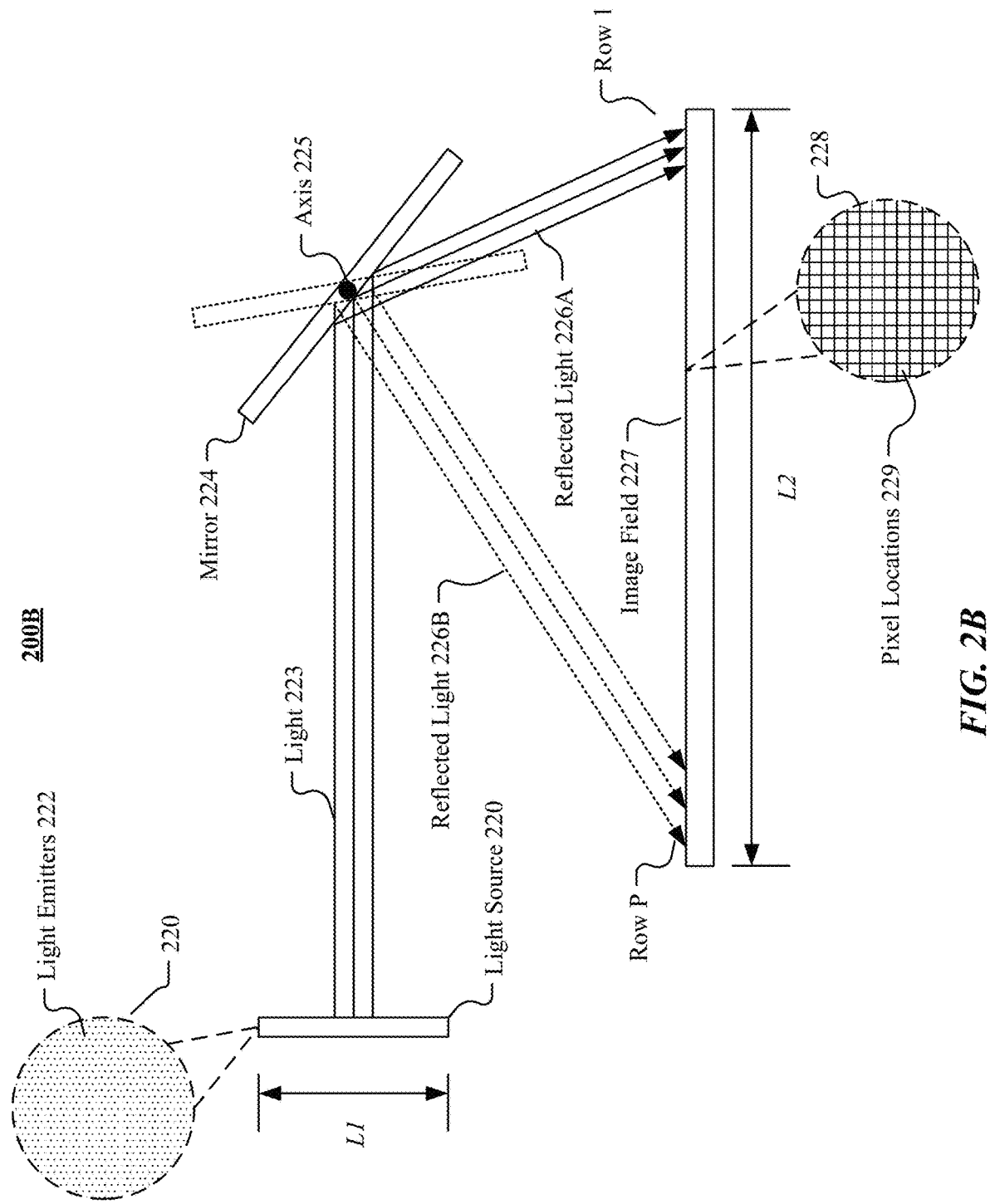
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
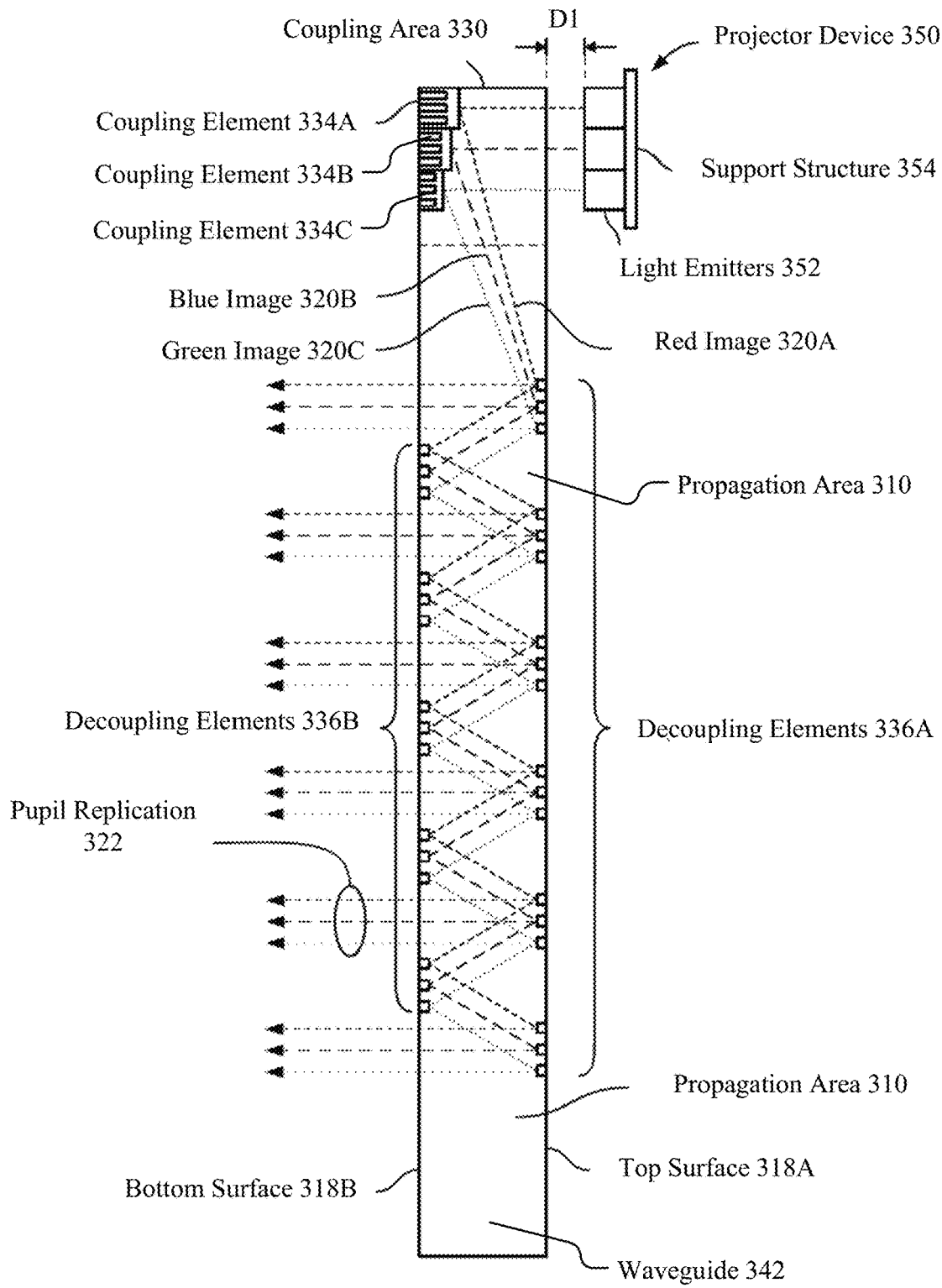
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

Display panels (e.g., µLED panels) used by AR/VR systems may have fault pixels (e.g., dead pixels) due to limitations of the state of art in manufacturing. The fault pixels may emit light with a light intensity that is different from a non-fault pixel (e.g., emitting no light, emitting light with a lower or higher light intensity), and negatively impact display quality and user experience of the AR/VR systems. Particular embodiments of the system may hide fault pixels of display panels by modifying the image to be output by the display. For example, the system may use a mask including an array of scaling factors to alter the pixel values of the image in a pixel region containing the fault pixel position. The image after being modified and output by the display may cause the fault pixel of the display to be invisible or have reduced visibility than the image without the modification, and therefore provide better display quality and improved user experience.

In particular embodiments, the RGB display panels of an AR/VR system may operate independently and not share color data between the three display panels. In particular embodiments, for correcting or hiding the dead pixels, the system may use luminance correction methods to correct the luminance of the pixel values of each color channel without using the color information between different color channels. The dead pixels may be independently associated with any color channel of the display. In particular embodiments, the system may use a luminance mask to modify the images before outputting the images on the display. The modified images may have their pixels values being altered (e.g., brightened or dimmed) in the pixel region containing the dead pixel position. The images, after being modified and output by the display may cause the dead pixels of the display to have a lower visibility than the images without the modification. In particular embodiments, the system may modify the images by a luminance mask to alter the pixel values in a pixel region containing the dead pixel position, as will be described below.

In particular embodiments, the system may generate and use a mask to modify the images to be output by the display to reduce the visibility of the dead pixels of the display. In particular embodiments, the mask for modifying the images may be a luminance mask for altering pixel values in a corresponding pixel region of the images in the luminance domain (without using the color information between different color channels). For correcting a particular dead pixel, the same luminance mask may be applied to all three color channels of the images in a corresponding pixel region containing the dead pixel position. The mask may be centered at the corresponding dead pixel position and have the same size with the pixel region. The size of the mask may be determined based on the likely minimum pixel distance between the dead pixels of the display. For example, if a display has a minimum pixel distance of 5 times of the pixel size, the system may generate a mask having a size of 5×5 pixels corresponding to a pixel region that contains no more than a single dead pixel.

In particular embodiments, the mask may be generated to minimize the mean-squared error over the support (e.g., real-valued functions being the subset of the domain containing elements that are not mapped to zero) of the mask based on a point spread function that is matched to human vision. As an example and not by way of limitation, the mask may be generated by solving an optimization equation as following:

$$\underset{x}{\operatorname{argmin}} \|M(F\{x\} - F\{I\})\|^2 \quad (1)$$

where, x is the scaling factor value of the mask, F{x} is a Fourier transform of the mask, M is a modulation transfer function of human eyes, I is an identity matrix. By solving the above optimization equation, the system may generate a luminance mask by minimizing the mean-squared error over the support of the mask based on a point spread function (which is the spatial domain version of the optical transfer function or modulation transfer function) that is matched to human vision. The mask may be circularly symmetric as determined by the point spread function of human vision.

Figures 4A, 4B:
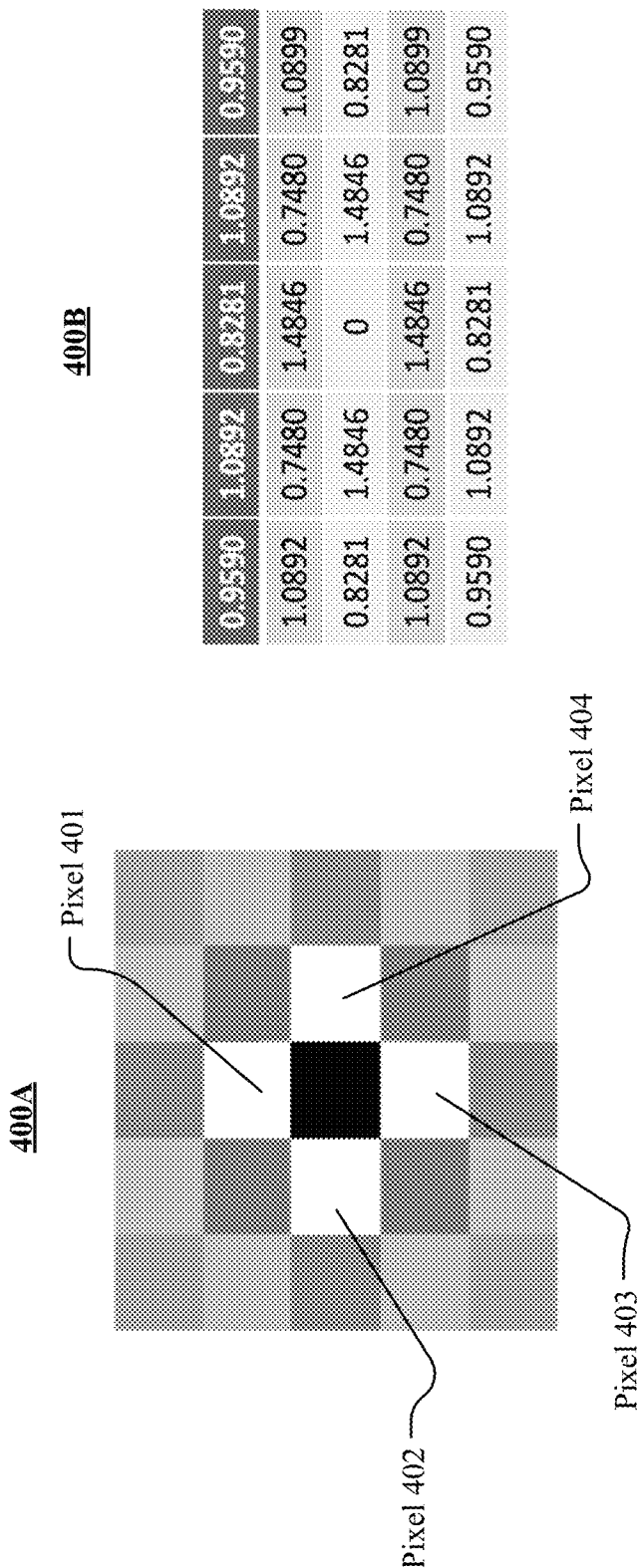
FIG. 4A illustrates an example process for hiding dead pixels using Floyd-Steinberg dithering.
FIG. 4B illustrates an example image with corrected dead pixels using Floyd-Steinberg dithering.

FIG. 4A illustrates an example luminance mask 400A for correcting dead pixels. FIG. 4B illustrates an example array of scaling factors 400B corresponding to the mask 400A in FIG. 4A. As an example and not by way of limitation, the display of the AR/VR system may have a minimum dead pixel distance of 5 pixels. In other words, the display may have no more than one dead pixel in a 5×5 pixel region of the display. The system may generate a mask having a size of 5×5 pixels, as shown in FIG. 4A. The mask may include an array of scaling factors, as shown in FIG. 4B, for scaling pixel values of the image in the corresponding pixel region. The center of the mask corresponding to the dead pixel position may correspond to a scaling factor equal to zero. Some scaling factors in the array may be greater than 1 for brightening a corresponding pixel value or smaller than 1 for dimming a corresponding pixel value. The scaling factor values at the symmetric positions (e.g., pixels 501, 502, 503, and 504) with respect to the center pixel of the mask may have the same value (e.g., 1.4846 for pixels 501, 502, 503, and 504). In particular embodiments, the system may generate and optimize the luminance mask offline and store the generated mask in memory storage. At run time, the system may access the stored mask for modifying images to be displayed to reduce the visibility of the dead pixels of the display.

In particular embodiments, the system may apply the mask to an image in a pixel region containing the dead pixel position to alter the pixel values in that pixel region to reduce the visibility of the dead pixel. In particular embodiments, the system may first scale all pixel values of the image by an overall scaling factor β which is less than 1 (e.g., 0.8) to allow the pixel values to have headroom for later scaling process by the scaling factors of the mask. As shown in the example mask in FIGS. 4A-4B, one or more scaling factors in the mask may be greater than 1 (e.g., the scaling factors equal to 1.4846 in FIG. 4B). When a large pixel value (e.g., close to the maximum pixel value) is multiplied by a scaling factor greater than 1, the modified pixel value may be greater than the maximum pixel value supported by the display. Scaling the pixel values of the whole image by an overall scaling factor (e.g., 0.8) may allow the pixel values to have appropriate headroom (e.g., 20% of the maximum pixel value for the overall scaling factor of 0.8) although the image may have reduced overall brightness (e.g., 20% loss for the overall scaling factor of 0.8).

In particular embodiments, for modifying the image to be displayed, the system may access a dead pixel position corresponding to a dead pixel of the display. The system may access an image to be displayed and modify the image by applying a mask to a pixel region of the image containing a particular pixel value. The mask and the corresponding pixel region may be centered at the dead pixel position. As described above, the mask may include an array of scaling factors for scaling pixels values in the pixel region. The array of scaling factors may be configured to alter (e.g., brighten or dim) one or more of the pixel values surrounding the particular pixel value corresponding to the dead pixel position. For applying the mask to the pixel region, the system may access each pixel value within the pixel region of the image and access a corresponding scaling factor from the array of scaling factors of the mask. Then, the system may determine a modified pixel value by multiplying that pixel value by the corresponding scaling factor accessed from the array of scaling factors. The system may repeat this process to determine each modified pixel value in the pixel region containing the dead pixel position.

In particular embodiments, when the image includes multiple dead pixels, the system may repeatedly apply the same mask to each pixel region containing a dead pixel position to alter the pixel values around the dead pixel position. The same mask may be applied to all three color channels (e.g., RGB) of the image. After all dead pixels being corrected in the image, the system may cause the modified image to be output by the display. As a result, the modified image as output by the display may cause the dead pixels of the display to have a lower visibility level than the images without modification. In particular embodiments, although the pixel values of the image may have been scaled down by the overall scaling factor before applying the mask, the result of the modified pixel value may still be greater than the maximum pixel value supported by the display hardware. The system may clip the modified pixel values to a normalized range of [0, 1] corresponding to the maximum pixel value supported by the display before sending the image to the display. It is notable that the minimum dead pixel distance of the display as a condition for applying a luminance mask with a corresponding size is for example purpose only. The application of the luminance mask is not limited to the displays having a corresponding minimum dead pixel distance. Even if a display does not satisfy the minimum dead pixel distance corresponding the mask size for all dead pixels, the mask may still be applied to that display to correct a subset of the dead pixels. For example, a display may have some dead pixels having a minimum dead pixel distance smaller than 5 pixels. The mask having a size of 5×5 pixels may still be applied to the display to correct the dead pixels that have a distance greater than 5 pixels. It is notable that the mask size of 5×5 pixels is for example purpose only and the mask size is not limited thereto. For example, the mask may have a size of N×N pixels, wherein N is any suitable integer number.

Figure 4C:
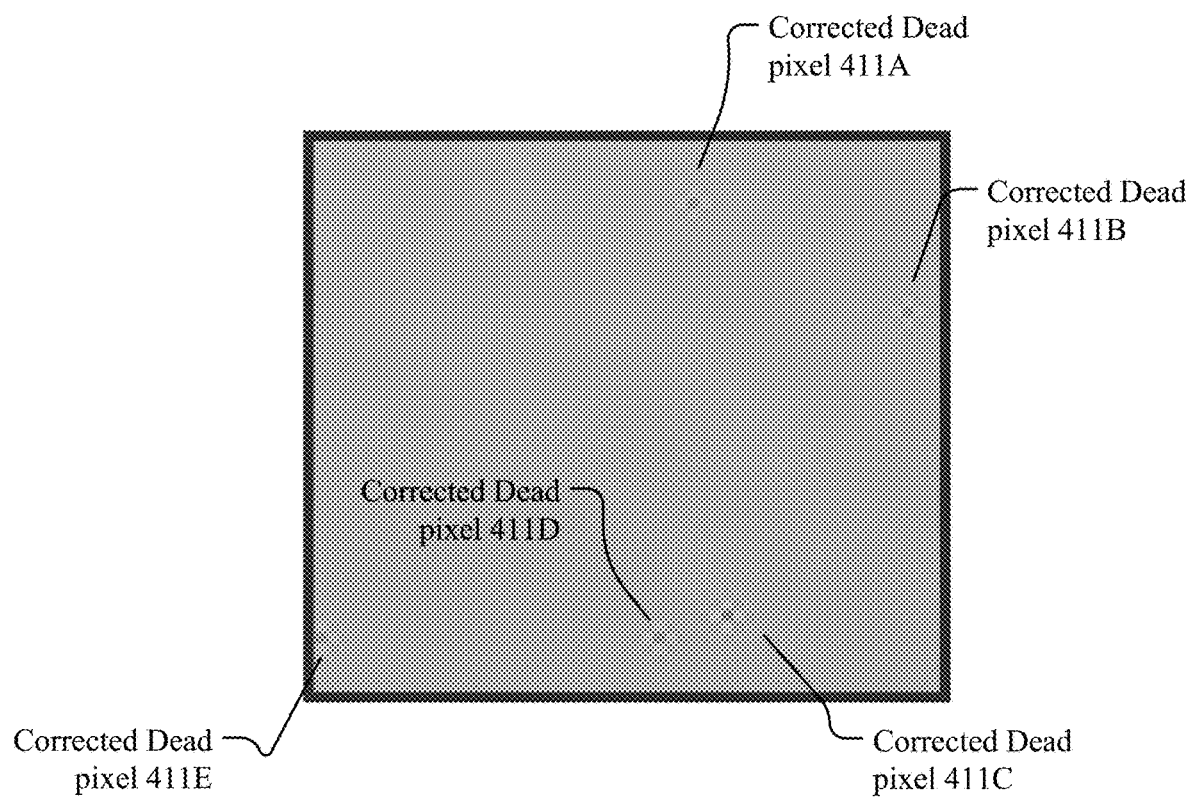
FIG. 4C illustrates an example image portion with corrected dead pixels.

FIG. 4C illustrates an example image portion with corrected dead pixels (e.g., 411A-411E). In particular embodiments, the system may effectively reduce the visibility of the dead pixels by applying the luminance mask to the pixel regions of the image containing respective dead pixel positions. In particular embodiments, the modified image may maintain a correct average brightness in the pixel region containing the dead pixel position to compensate the dead pixel defect of the display. For example, the image after being modified may have a first average brightness in the pixel region within a threshold range with respect to a second average brightness of that pixel region of the image before being modified. In particular embodiments, by using the luminance mask, the system may correct the dead pixels without using a line buffer or row buffer as in the dithering algorithms. Applying a mask with a size of N×N pixels may need N×N−1 multiplication operations. The altered pixel values may be any pixel in the pixel region containing the dead pixel position and may not be limited to the forward and downward pixels of the current pixels as in the Floyd-Steinberg dithering algorithm. As a result, the modified image by the luminance mask may not have temporal artifacts, and therefore provide better display quality and improved user experience.

In particular embodiments, the display (e.g., an OLED display, a micro-LED display) of the AR/VR system may have larger red and blue pixels than green pixels. As an example and not by way of limitation, the display may have a larger number of green pixels than the red pixels or blue pixels while the red and blues pixels may have greater size than the green pixels. Each red pixel and each blue pixel may be surrounded by four respective green pixels. In particular embodiments, the systems, methods, and processes for correcting dead pixels may be applicable to displays with larger red and blue pixels. In particular embodiments, the corrected dead pixels (e.g., large red or blue pixels) may have reduced visibility to human eyes after being corrected by the mask matched to the point spread function of the human vision. In particular embodiments, the system may effectively correct dead pixels for displays for binocular vision.

In particular embodiments, the image may be modified for correcting dead pixels during one or more execution steps of a graphic pipeline implemented on a display engine. In particular embodiments, the graphic pipeline may include steps including, for example, but not limited to, warping one or more surfaces associated with the image, determining one or more pixel values of the image by sampling a plurality of texels, correcting one or more distortions of the image, propagating, by one or more spatial or temporal dithering processes, quantization errors of the image spatially or/and temporally. In particular embodiments, the image may be modified using the luminance mask for dead pixel correction before being processed by the one or more spatial or/and temporal dithering processes for propagating quantization errors.

In particular embodiments, the system may access a dead pixel position corresponding to a dead pixel of a display, access an image to be output by the display having one or more dead pixels, and modify the image by applying a mask to a pixel region of the image containing a particular pixel value with a position that corresponds to the dead pixel position. The mask may include an array of scaling factors for scaling pixels values in the pixel region. The array of scaling factors may be configured to alter one or more of the pixel values surrounding the particular pixel value corresponding to the dead pixel position. The system may cause the modified image to be output by the display. In particular embodiments, the mask may be generated by minimizing a mean-squared error caused by the dead pixel as modulated by a point spread function matched to human vision. In particular embodiments, the image after being modified may have a first average brightness in the pixel region being within a threshold range with respect to a second average brightness of the pixel region of the image before being modified. In particular embodiments, the mask may be circular symmetric as determined by the point spread function matched to human vision. In particular embodiments, the modified image may cause the dead pixel of the display to have a lower visibility level than the image before being modified. In particular embodiments, the array of scaling factor may be configured to brighten or dim one or more of the pixels values surrounding the particular pixel value corresponding to the dead pixel position.

In particular embodiments, the system may scale each pixel value of the image by an overall scaling factor before applying the luminance mask to the image. In particular embodiments, the overall scaling factor may be equal to 0.8 and the mask may include a 5×5 array of scaling factors. In particular embodiments, the mask may be applied to the pixel region by: accessing each pixel value within the pixel region of the image, accessing a corresponding scaling factor from the array of scaling factors, and determining a modified pixel value by multiplying that pixel value by the corresponding scaling factor accessed from the array of scaling factors of the mask. In particular embodiments, the system may clip the modified pixel value to a normalized range of [0, 1]. In particular embodiments, the pixel region of the image may be centered at the dead pixel position and the mask may have a same size to the pixel region containing the dead pixel position. In particular embodiments, the mask may include a center scaling factor being equal to zero in a center position of the mask and the center scaling factor may be applied to the dead pixel position of the image.

In particular embodiments, the image may be modified by one or more processes of a graphic pipeline implemented on a display engine. The graphic pipeline may include one or more steps of: warping one or more surfaces associated with the image, determining one or more pixel values of the image by sampling a plurality of texels, correcting one or more distortions of the image, or propagating, by one or more spatial or temporal dithering processes, quantization errors of the image spatially or temporally. In particular embodiments, the image may be modified before being processed by one or more spatial or temporal dithering processes for propagating quantization errors.

In particular embodiments, the dead pixel of the display may be associated with a color channel of RGB color channels of the display and the mask may be applied to each color channel of the RGB color channels. In particular embodiments, the dead pixel of the display may be a green pixel associated with a green color channel, and the green pixel may have a size smaller than pixels of red and blue color channels. In particular embodiments, the dead pixel of the display may be a red or blue pixel and the dead pixel may have a larger size than pixels of a green color channel. In particular embodiments, the display may be a micro-LED display having a single dead pixel within a display region corresponding a size of the mask. In particular embodiments, the system may access three pixel correction matrices each comprising an array of second scaling factors for scaling pixel values of an associated color channel of the image for correcting pixel non-uniformity of the display. The system may combine the mask into each pixel correction matrix by multiplying each mask value in the mask to an associated second scaling factor of that pixel correction matrix. The mask value and the associated second scaling factor may be associated with the same pixel. In particular embodiments, the system may apply the three pixel correction matrices to respective color channels of the image by multiplying each matrix value to a corresponding pixel value of the image to correct pixel non-uniformity and the dead pixel using the same process and at the same time.

In particular embodiments, to further improve the display quality and reduce the visibility of the dead pixels, the system may use a set of three masks for altering the pixel values of respective three color channels of the image (rather than a luminance mask). Each mask of the set of three mask may include an array of scaling factors to alter the pixel values of an associated color channel of the image in a pixel region containing the dead pixel position. The images after being modified and output by the display may cause the dead pixels of the display to be invisible or have reduced visibility than the images without modification, and therefore provide better display quality and improved user experience for the AR/VR systems.

In particular embodiments, the opponent color space may be a color space corresponding to how colors are perceived by human vision (which is not well represented by the RGB color space). In particular embodiments, the opponent color space may include three elements as represented in the following equation:

$$\begin{bmatrix} L \\ O_1 \\ O_2 \end{bmatrix} = \begin{bmatrix} 1 & 1 & 1 \\ -1 & 1 & 0 \\ -1 & -1 & 1 \end{bmatrix} \begin{bmatrix} R \\ G \\ B \end{bmatrix} \quad (2)$$

where, $L$, $O_1$, and $O_2$ are the three elements of the opponent color space, $R$, $G$, and $B$ are the color elements of the RGB color space. In other words, $L$ may correspond to the luminance change (R+G+B), $O_1$ may correspond to a red-green difference channel (G−R), and $O_2$ may correspond to a blue-yellow different channel (B−Y) or (B−(R+G)). In particular embodiments, the opponent color space may be represented in the following equation:

$$\begin{bmatrix} L \\ O_1 \\ O_2 \end{bmatrix} = \begin{bmatrix} 0.2814 & 0.6938 & 0.0638 \\ -0.0917 & 0.1458 & -0.0250 \\ -0.0930 & -0.2529 & 0.4665 \end{bmatrix} \begin{bmatrix} R \\ G \\ B \end{bmatrix} \quad (3)$$

where, $L$, $O_1$, and $O_2$ are the three elements of the opponent color space, $R$, $G$, and $B$ are the color elements of the RGB color space. It is notable that the opponent color spaces as represented by Equations (2) and (3) are for example purpose only and the opponent color space is not limited thereto. For example, the opponent color space used in the optimization process may have any suitable coefficients for transforming the RGB color space to the opponent color space.

In particular embodiments, for correcting a dead pixel of a particular color channel, the system may use a set of three masks for altering the pixel value of three color channels of the image, respectively (instead of applying the same mask to all three color channels as described in earlier section of this disclosure). The system may generate three sets of masks including a first set of masks for red dead pixels, a second set of masks for green dead pixels, and a third set of masks for blue dead pixels. Each set of masks may include three masks corresponding to three color channels. The masks may be generated to minimize the mean-squared error caused by the dead pixel in an opponent color space as modulated by the modulation transfer function (MTF) of the display and the modulation transfer function (MTF) of the human eyes. In particular embodiments, the system may generate the three sets of masks by solving an optimization problem as represented by the following equation:

$$\mathrm{argmin}_{x} \|W_1 W_2 C(F\{x - I\})\|^2 \quad (4)$$

where, $x$ is the scaling factor value of the mask, $I$ is the identify matrix, $F\{\ \}$ is the Fourier transform in an RGB color space, $C$ is a color space transform for transforming an RGB color space into an opponent color space, $W_1$ is a filter in the opponent color space corresponding to a first modulation transfer function of human eyes, and $W_2$ is a filter in the opponent color space corresponding to a second modulation transfer function (MTF) of the display system. The modulation transfer function (MTF) of the display may account for the blurring effect of the display. By solving the optimization problem, the system may generate three sets of masks by minimizing a mean-squared error caused by the dead pixel in an opponent color space as modulated by the modulation transfer function (MTF) of the display and human eyes.

In particular embodiments, the system may generate the three sets of masks by solving an optimization problem as represented by the following equation:

$$\mathrm{argmin}_{x} \|W_1 C(W_2 F\{x\} - F\{I\})\|^2 \quad (5)$$

where, $x$ is the scaling factor value of the mask, $I$ is the identify matrix, $F\{\ \}$ is the Fourier transform in an RGB color space, $C$ is a color space transform for transforming an RGB color space into an opponent color space, $W_1$ is a filter in the opponent color space corresponding to a first modulation transfer function of human eyes, and $W_2$ is a filter in the opponent color space corresponding to a second modulation transfer function (MTF) of the display system. In Equation (3), the $W_2$ may be applied to the Fourier transform of the mask before subtracting the mask to the Fourier transform of the identify matrix I. The optimized masks may be generated by solving either Equation (4) or Equation (5) to minimize a mean-squared error caused by the dead pixel in an opponent color space as modulated by the modulation transfer function (MTF) of the display. By considering the MTF of the display and human vision during the optimization process, the system may generate the optimized masks which allow the dead pixels to have lower visibility as displayed by the display and as perceived by human eyes.

In particular embodiments, the system may solve the optimization problem as represented by Equations (4) or (5) under a constraint condition for the mask value range as represented by the following expression:

$$\beta - 1 \leq x \leq \beta \quad (6)$$

where, $\beta$ is an overall scaling factor for scaling down all pixel values of the image (e.g., before applying the set of three masks for correcting dead pixels) to allow the pixel values to have enough headroom (e.g., 20% headroom for $\beta=0.8$). The overall scaling factor $\beta$ may correspond to the peak brightness reduction of the image. By solving the optimization equations under this constraint condition, the system may generate optimized masks having scaling factors values that allow the modified pixel value of the image to be no greater than the maximum pixel values as supported by the display. Consequently, the system may modify the image by directly applying the set of three masks to the three color channels without clipping the modified pixel values to the normalized range of [0, 1] after the modification.

In particular embodiments, the system may modify the images to be output by the display by applying a set of three masks to the three color channels of the image. The masks may have pre-determined size and may be centered at the dead pixel position. The size of the masks may be determined based on the likely minimum pixel distance of the dead pixels of the display. For example, if a display has a minimum pixel distance of 5 times of a pixel size (e.g., a pixel length along the X or Y dimension), the system may generate masks having a size of 5×5 pixels which may correspond to a pixel region that contains a single dead pixel. In particular embodiments, the mask may be generated to minimize the mean-squared error over the support (i.e., real-valued functions being the subset of the domain containing elements that are not mapped to zero) of the mask based on a point spread function that is matched to human vision and the modulation transfer function (MTF) of the display. The masks may be circularly symmetric as determined by the point spread function of human vision. As an example and not by way of limitation, each mask may include an N×N array of scaling factors corresponding to an N×N pixel array. It is notable that the minimum dead pixel distance of the display for applying masks with a corresponding size is for example purpose only. The application of the masks is not limited to the displays having a corresponding minimum dead pixel distance. Even if a display does not satisfy the minimum dead pixel distance corresponding the mask size, the masks may still be applied to that display to correct a subset of the dead pixels. For example, a display may have some dead pixels having a minimum dead pixel distance smaller than 5 pixels. The masks having a size of 5×5 pixels may still be applied to the display to correct the dead pixels that have a distance greater than 5 pixels.

Figure 5A:
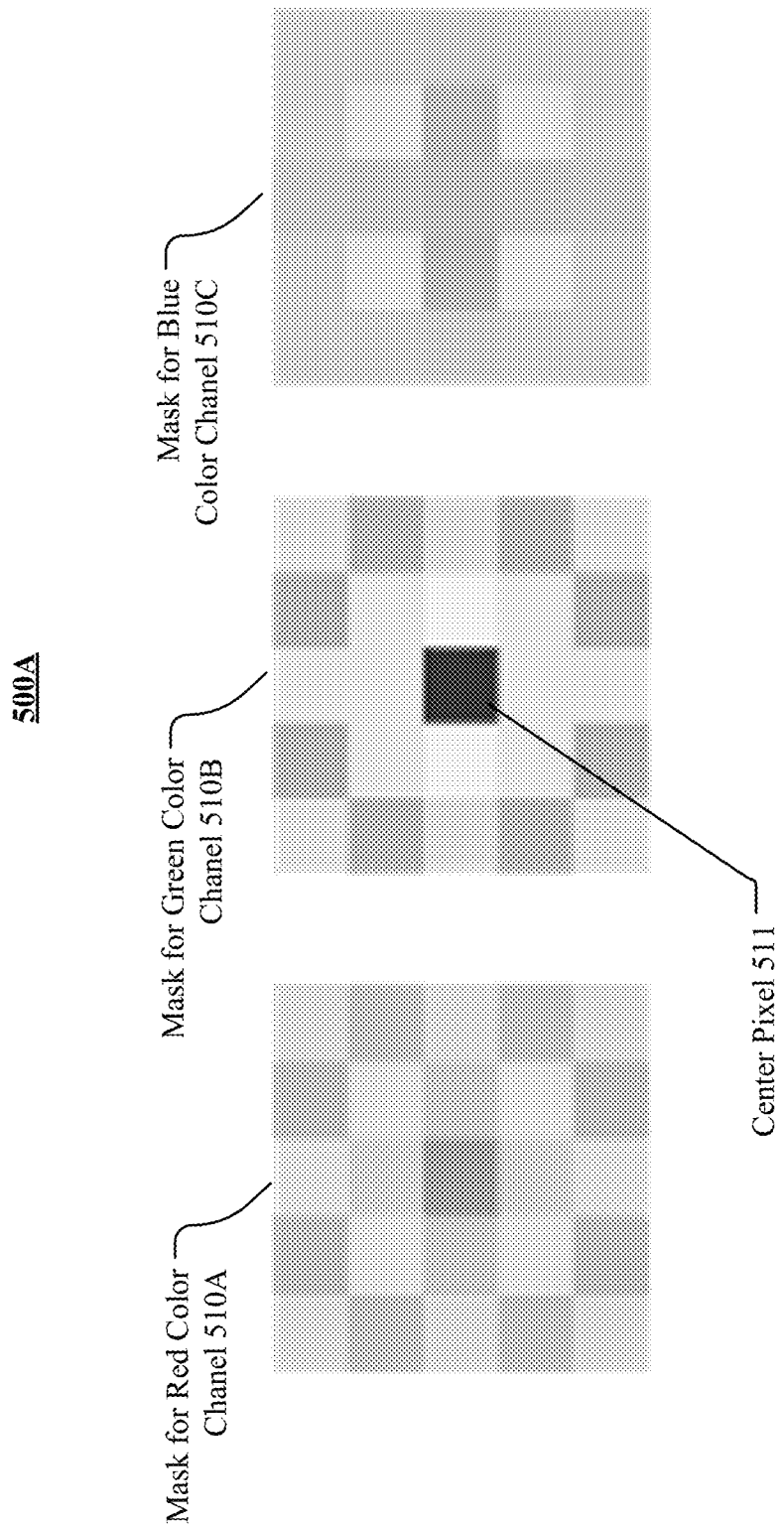
FIG. 5A illustrates an example luminance mask for correcting dead pixels.

FIG. 5A illustrates an example set of three masks 510A, 510B, and 510C for correcting a green dead pixel. In particular embodiments, the system may generate three sets of masks for correcting dead pixels of three color channels. Each set of masks may include three masks for altering the pixel values of the image in three color channels, respectively. As an example and not by way of limitation, the system may generate a set of three masks 510A, 510B, and 510C, as shown in FIG. 5A, for correcting dead pixels of a green color channel. The set of three masks 510A, 510B, and 510C may correspond to a pixel region including an array of 5×5 pixels. The set of three masks 510A, 510B, and 510C may be applied to a corresponding pixel region of the image in respective color channels. For example, the mask 510A may be applied to the red color channel of the image for altering the red pixel values of the image in the corresponding pixel region containing the dead pixel position. The mask 510B may be applied to the green color channel of the image for altering the green pixel values of the image in the corresponding pixel region containing the dead pixel position. The mask 510C may be applied to the blue color channel of the image for altering the blue pixel values of the image in the corresponding pixel region containing the dead pixel position. It is notable that, although the dead pixel in this example is only in the green color channel, the pixel values of all three color channels of the images may be altered by respective masks. This is because the optimization of the masks are performed in the opponent color space (L, $O_1$, $O_2$) for human vision perception. To adjust or alter any component value (e.g., L, $O_1$, or $O_2$) of the opponent color space, two or more components of the RGB color space may need to be altered or adjusted correspondingly.

FIG. 5B illustrates example mask values for the set of three masks 510A, 510B, and 510C for correcting a green dead pixel. It is notable that the mask values as shown in FIG. 5B are not the scaling factor values that are directly multiplied by the pixel values. Instead, for a mask value x, the system may determine a corresponding scaling factor (1−x) by subtracting the mask value x from 1. The system may multiply the corresponding pixel values by the scaling factor of (1−x). For example, the first mask 510A for the red color channel may have a center mask value of zero. The corresponding center pixel of the red color channel may be multiplied by (1-0) and therefore may have no change by this mask value. As another example, the second mask 510B for the green color channel may have a center mask value of 1. The corresponding value of the center pixel of the green color channel, which corresponds to the dead pixel, may be multiplied by (1−1) and therefore may have zero value as a result. As another example, the third mask 510C for the blue color channel may have a center mask value of 0. The corresponding value of the center pixel of the blue color channel may be multiplied by (1-0) and therefore may have its value unchanged. Similarly, for applying each mask of the set of three masks to a corresponding color channel, the system may access each mask value x and determine a corresponding scaling factor by (1−x) which will be multiplied by the corresponding pixel value to be altered.

Comparing the mask values between the set of three masks 510A, 510B, and 510C, which are for correcting the dead pixels of green color channel, the mask 510B for the green color channel may have relative larger deviation amplitudes from 1 with respect to the other two masks 510A and 510C. In other words, for correcting dead pixels of the green color channel, the pixel values of the green color channel may have greater changes than those of the red and blue color channels. In this example, the pixel value for the dead green pixel may be zero as altered by the corresponding mask value 1 (and the scaling factor of (1−1)). The pixel value for the red and blue pixel at the dead pixel position may be unchanged. All other pixel values in the mask region may be altered respectively based on the corresponding mask values to compensate the dead pixel defect. As a result, the modified image after being output by the display may cause the green dead to have reduced visibility.

FIG. 5C illustrates example mask values for a set of three masks 520A, 520B, and 520C for correcting a red dead pixel. In this example, the first mask 520A for the red color channel may have a center mask value of 1. The corresponding center pixel of the red color channel, which is the dead pixel, may be multiplied by (1−1) and therefore may be zero as a result. The second mask 520B for the green color channel may have a center mask value of 0. The corresponding value of the center pixel of the green color channel may be multiplied by (1−0) and therefore may have its value unchanged. The third mask 520C for the blue color channel may have a center mask value of 0. The corresponding value of the center pixel of the blue color channel may be multiplied by (1−0) and therefore may have its value unchanged. Comparing the mask values between the set of three masks 520A, 520B, and 520C, which are for correcting the red dead pixels, the mask 510A for the red color channel may have relative larger deviation amplitudes from 1 with respect to the other two masks 520B and 510C. In other words, for correcting red dead pixels, the pixel values of the red color channel may have greater changes than those of the green and blue color channels. In this example, the pixel value for the red dead pixel may be zero as altered by the corresponding mask value 1 (and the scaling factor of (1−1)). The pixel value for the green and blue pixel at the dead pixel position may be unchanged. All other pixel values in the mask region may be altered respectively based on the corresponding mask values to compensate the dead pixel defect. As a result, the modified image after being output by the display may cause the red dead pixel to have reduced visibility.

FIG. 5D illustrates example mask values for a set of three masks 530A, 530B, and 530C for correcting a blue dead pixel. In this example, the first mask 530A for the red color channel may have a center mask value of 0. The corresponding center pixel of the red color channel may be multiplied by (1−0) and therefore may have it value unchanged. The second mask 520B for the green color channel may have a center mask value of 0. The corresponding value of the center pixel of the green color channel may be multiplied by (1−0) and therefore may have its value unchanged. The third mask 520C for the blue color channel may have a center mask value of 1. The corresponding value of the center pixel of the blue color channel, which corresponds to the dead pixel, may be multiplied by (1−1) and therefore may be zero as a result. Comparing the mask values between the set of three masks 530A, 530B, and 530C, which are for correcting the blue dead pixels, the mask 530C for the blue color channel may have relative larger deviation amplitudes from 1 with respect to the other two masks 530A and 530B. In other words, for correcting blue dead pixels, the pixel values of the blue color channel may have greater changes than those of the red and green color channels. In this example, the pixel value for the blue dead pixel may be zero as altered by the corresponding mask value 1 (and the scaling factor of (1−1)). The pixel value for the red and green pixel at the dead pixel position may be unchanged. All other pixel values in the mask region may be altered respectively based on the corresponding mask values to compensate the dead pixel defect. As a result, the modified image after being output by the display may cause the blue dead pixel to have reduced visibility.

Comparing the three masks of 510A, 520B, and 530C, the mask values in 520B may have relative smaller deviation amplitudes from 1 than the mask 510A (which may have relative smaller deviation amplitudes from 1 than the mask 530C). This is because human eyes are more sensitive to green light than red and blue light. For correcting a green dead pixel, the pixel values may be altered in relative smaller amplitudes than the red dead pixel or the blue dead pixel. In particular embodiments, since the mask values are optimized to the final results as displayed by display and as perceived by human vision, the deviation amplitudes of the mask values from 1 may depend on a sensitivity of the human eyes to the color channel being associated with the corresponding dead pixels.

In particular embodiments, for applying a set of three masks to an image, the system first scale all pixel values of the image by an overall scaling factor β (e.g., 0.8) to allow the pixel values to have appropriate headroom (e.g., 20%). Scaling by the overall scaling factor may result in a reduced overall brightness of the image (e.g., 20%). Because the mask values are generated by solving the optimization equations under the constraint condition of 1−β≤x≤β, the mask values may allow the modified pixel values of the image to be no greater than the maximum pixel value as supported by the display. The system may access a dead pixel position corresponding to a dead pixel being associated with a particular color channel of the display. Then system may access an image including pixel values for three color channels as represented by the following equation:

$$P=(P_r, P_g, P_b) \tag{7}$$

where, P is the pixel value matrix of the image, $P_r$, $P_g$, and $P_b$ are the pixel value matrices for RGB color channels. The system may select a set of three masks based on the color channel associated with the dead pixel. The system may modify the image by applying the set of three masks to a pixel region of the image containing a particular pixel value with a position that corresponds to the dead pixel position. As an example and not by way of limitation, for correcting a green dead pixel, the system may choose the set of three masks 510A, 510B, and 510C (as shown in FIG. 8B) from the nine masks generated during the optimization process. Similarly, for correcting a red dead pixel, the system may choose the set of three masks 520A, 520B, and 520C as shown in FIG. 5C. For correcting a blue dead pixel, the system may choose the set of three masks 530A, 530B, and 530C as shown in FIG. 5D. The selected set of three masks may be respectively applied to three color channels of pixel values in the pixel region of the image. The set of three masks may be configured to minimize a mean-squared error caused by the dead pixel in an opponent color space.

In particular embodiments, the system may determine the modified pixel values by applying masks having a size of 5×5 pixels using processes as represented in the following equations:

$$P_{rx-2:rx+2, ry-2:ry+2} = P_{rx-2:rx+2, ry-2:ry+2} \cdot (1-F_r) \tag{8}$$

$$P_{gx-2:gx+2, gy-2:gy+2} = P_{gx-2:gx+2, gy-2:gy+2} \cdot (1-F_g) \tag{9}$$

$$P_{bx-2:bx+2, by-2:by+2} = P_{bx-2:bx+2, by-2:by+2} \cdot (1-F_g) \tag{10}$$

where, $P_{rx, ry}$ is the red pixel value at the position of (x, y), $P_{gx, gy}$ is the green pixel value at the position of (x, y), $P_{bx, by}$ is the blue pixel value at the position of (x, y), $F_r$ is the corresponding mask value for red color channel, $F_g$ is the corresponding mask value for green color channel, $F_b$ is the corresponding mask value for red color channel. In other words, for applying the set of three masks to respective color channels of the image in the pixel region, the system may select an associated color-specific mask from the set of three masks for an associated color channel. The system may access each pixel value of the associated color channel of the image in the pixel region and modify a pixel value of each pixel of the associated color channel of the image in the pixel region by multiplying that pixel value by a scaling factor that is determined based on a corresponding mask value of the color-specific mask.

As an example and not by way of limitation, an image may be displayed on a display having a dead pixel in the green color channel. For correcting the green dead pixel, the system may select a set of three masks for modifying the pixel values of the image. The set of three masks may be selected from a number of sets of masks which may be generated for correcting dead pixels of different color channels. The masks may be generated by solving an optimization problem to minimize the mean-squared error caused by the dead pixel in Fourier-opponent space. The system may access the three masks and apply them to the image in a pixel region containing the dead pixel position. In particular, the system may access each mask value x in each mask and multiply a corresponding pixel value p by a scaling factor (1−x) as determined based on that mask value x. The three masks may be applied to the image in RGB color channels, respectively. After being modified by the set of three masks, the image may be output by the display and viewed by users. In particular embodiments, the masks may be optimized taking into consideration of the modulation transfer function (MTF) of the display. As an example and not by way of limitation, the percentage value of the MTF function of the display may decline when the spatial frequency increases.

For example, the percentage value of the MTF function may be about 10% when the spatial frequency reaches about 18.5 cycles/degree.

Figure 5E:
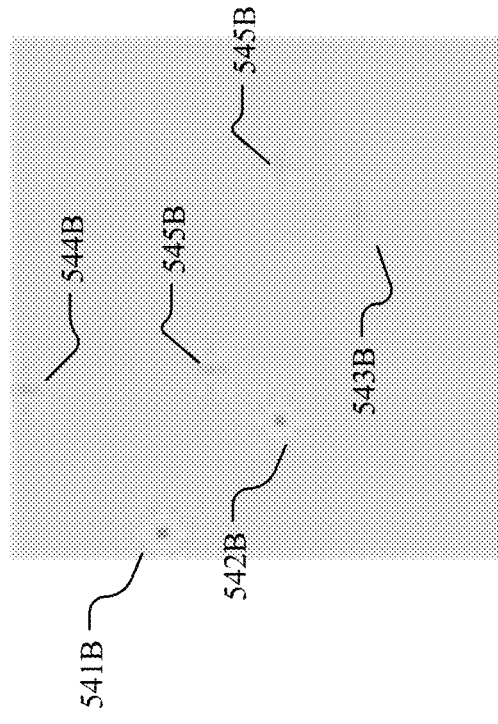
FIGS. 5E-5F illustrate example images with corrected dead pixels before and after applying the modulation transfer function (MTF) of the display.
Figure 5F:
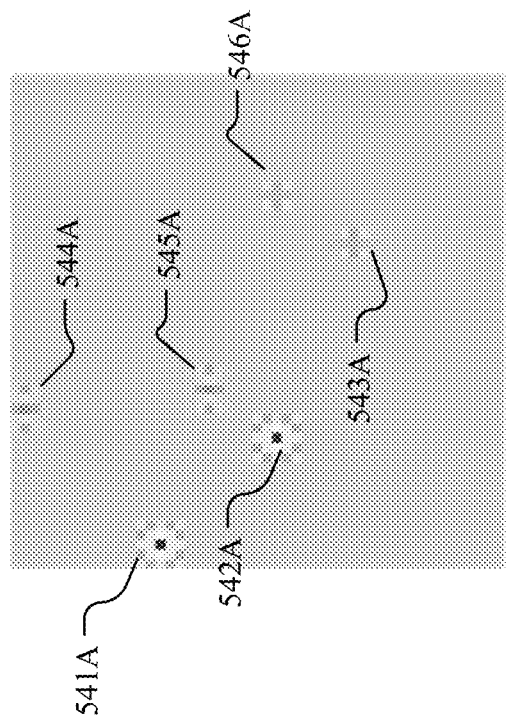

FIGS. 5E-5F illustrate example images 540A and 540B with corrected dead pixels before and after applying the modulation transfer function (MTF) of the display. As an example and not by way of limitation, the image 540A may include six dead pixel positions each being associated with a particular color channel. The distance between any two dead pixels may be no less than the size of the masks (e.g., 5×5 pixels). The system may select a set of three masks for each dead pixel based on the associated color channel and apply the six sets of masks to the image in the respective pixel regions containing the dead pixel positions. As a result, the image may have altered pixel values in the pixel regions containing the dead pixel positions to compensate the dead pixel defect. The image 540B shows the corrected dead pixels before the modulation transfer function (MTF) of the display is applied. The image 540B shows the corrected dead pixels after the modulation transfer function (MTF) of the display is applied. The image 540B may include the blur effect by the modulation transfer function (MTF) of the display. As shown in FIG. 5F, the corrected dead pixels may have much lower visibility after being corrected by corresponding set of masks. By using a different mask for each color channel of the image, the system may have better result (e.g., lower visibility) in the corrected dead pixels than using a single luminance mask for all three color channels.

In particular embodiments, the system may access a dead pixel position corresponding to a dead pixel of a display. The dead pixel may be associated with a color channel of three color channels of the display. The system may access an image to be displayed on the display having the dead pixel, select a set of three masks based on the color channel associated with the dead pixel and modify the image by applying the set of three masks to a pixel region of the image containing a particular pixel value with a position that corresponds to the dead pixel position. The set of three masks may be respectively applied to three color channels of pixel values in the pixel region of the image. The set of three masks may be configured to minimize an error caused by the dead pixel in an opponent color space. The system may cause the modified image to be output by the display.

In particular embodiments, the error that the set of three masks are configured to minimize may be a mean-squared error caused by the dead pixel in the opponent color space as modulated by a point spread function of human vision. In particular embodiments, the mean-squared error caused by the dead pixel may be minimized in the opponent color space as modulated by the point spread function of human vision and a modulation transfer function of the display. In particular embodiments, each mask of the set of three masks may include an array of mask values for determining an array of scaling factors for scaling pixel values of an associated color channel of the image in the pixel region. The array of scaling factors may be configured to brighten or dim the pixel values of the associated color channel of the image in the pixel region. In particular embodiments, each mask of the set of three masks may be circular symmetric as determined by a point spread function of human vision.

In particular embodiments, the modified image may cause the dead pixel of the display to have a lower visibility level than the image before being modified. The set of three masks may be selected from three sets of masks and each set of the three sets of masks may be for a particular color channel that the dead pixel is associated with. In particular embodiments, the three sets of masks are generated by solving an optimization equation of $$\operatorname*{argmin}_{x} \|W_1 C(W_2 F\{x\} - F\{I\})\|^2,$$

where the $F\{x\}$ is a Fourier transform, $W_1$ is a first modulation transfer function of human vision, $W_2$ is a second modulation transfer function of the display, C is a color space transform for transforming a RGB color space to an opponent color space, the I is an identity matrix. In particular embodiments, the optimization equation may be subjected to a constraint condition of $\beta-1 \leq x \leq \beta$, wherein $\beta$ is an overall scaling factor for pixel values of the image. In particular embodiments, the system may scale each pixel value of the image by the overall scaling factor $\beta$ before or after applying the masks for correcting dead pixels.

In particular embodiments, the set of three masks may be applied to respective color channels of the image in the pixel region by: selecting a color-specific mask from the set of three masks for an associated color channel, accessing each pixel value of the associated color channel of the image in the pixel region, and modifying a pixel value of each pixel of the associated color channel of the image in the pixel region by multiplying that pixel value by a scaling factor that is determined based on a corresponding mask value of the color-specific mask. In particular embodiments, the display may be a micro-LED display having a single dead pixel within a display region corresponding to a mask size of the set of three masks. In particular embodiments, the pixel region of the image may be centered at the dead pixel position corresponding to the dead pixel of the display. Each mask of the set of three masks may have a same size to the pixel region containing the dead pixel position.

In particular embodiments, the image may be modified by one or more processes of a graphic pipeline implemented on a display engine. In particular embodiments, the graphic pipeline may include one or more steps of, for example, but are not limited to, warping one or more surfaces associated with the image, determining one or more pixel values of the image by sampling a plurality of texels, correcting one or more distortions of the image, propagating, by one or more spatial or temporal dithering processes, quantization errors of the image spatially or temporally. In particular embodiments, the image may be modified before being processed by the one or more spatial or temporal dithering processes for propagating the quantization errors. In particular embodiments, the dead pixel of the display may be a green pixel associated with a green color channel and the green pixel may have a size smaller than pixels of red and blue color channels. In particular embodiments, the dead pixel of the display may be a red or blue pixel and the dead pixel may have a larger size than pixels of a green color channel. In particular embodiments, the system may access three pixel correction matrices each comprising an array of scaling factors for scaling pixel values of an associated color channel to correct pixel non-uniformity. The system may combine each of the set of three masks into a corresponding pixel correction matrix by multiplying each mask value in that mask to an associated scaling factor of the corresponding pixel correction matrix. The mask value and the associated second scaling factor may be associated with a same pixel. In particular embodiments, the system may apply the three pixel correction matrices to respective color channels of the image by multiplying each matrix value to a corresponding pixel value of an associated color channel of the image to correct pixel non-uniformity and the dead pixel using a same process and at the same time.

Mask-based methods for correcting display fault pixels (e.g., dead pixels) may assume uniform pixel sizes and well-aligned RGB pixel arrays. However, the light-emitting elements of different color channels of the display (e.g., RGB µLED arrays) may be misaligned due to manufacturing imperfectness. For example, the pixels that are close to each other in a viewer space as perceived by a viewer may correspond to light-emitting elements having different relative positions in associated light-emitting element arrays. The positions of some light-emitting elements may be rotated or offset with respect to adjacent light-emitting elements. Furthermore, due to optical distortion (e.g., caused by lenses or waveguides), pixels at different locations of a viewer space as perceived by a viewer may appear to have different sizes and angular distances with respect to each other. As a result, the misalignment of the light-emitting elements and optical distortion of the lenses may negatively affect the compensated visual effect of display compensation algorithms (e.g., fault/dead pixel correction, dithering, etc.) that assume uniform pixel sizes and well-aligned RGB light-emitting element arrays.

Particular embodiments of the system may determine, for the pixels that are close to each other in the viewer space, relative positions of the corresponding light-emitting elements within respective light emitting element arrays. The system may apply the correction masks to pixels that are visually close to each other based on the relative positions of the corresponding light emitting elements. The correction masks may be customized based on pixel positions in the viewer space. Particular embodiments of the system may allow the display compensation algorithms to provide better visual effect for the compensated pixels.

Figure 6:
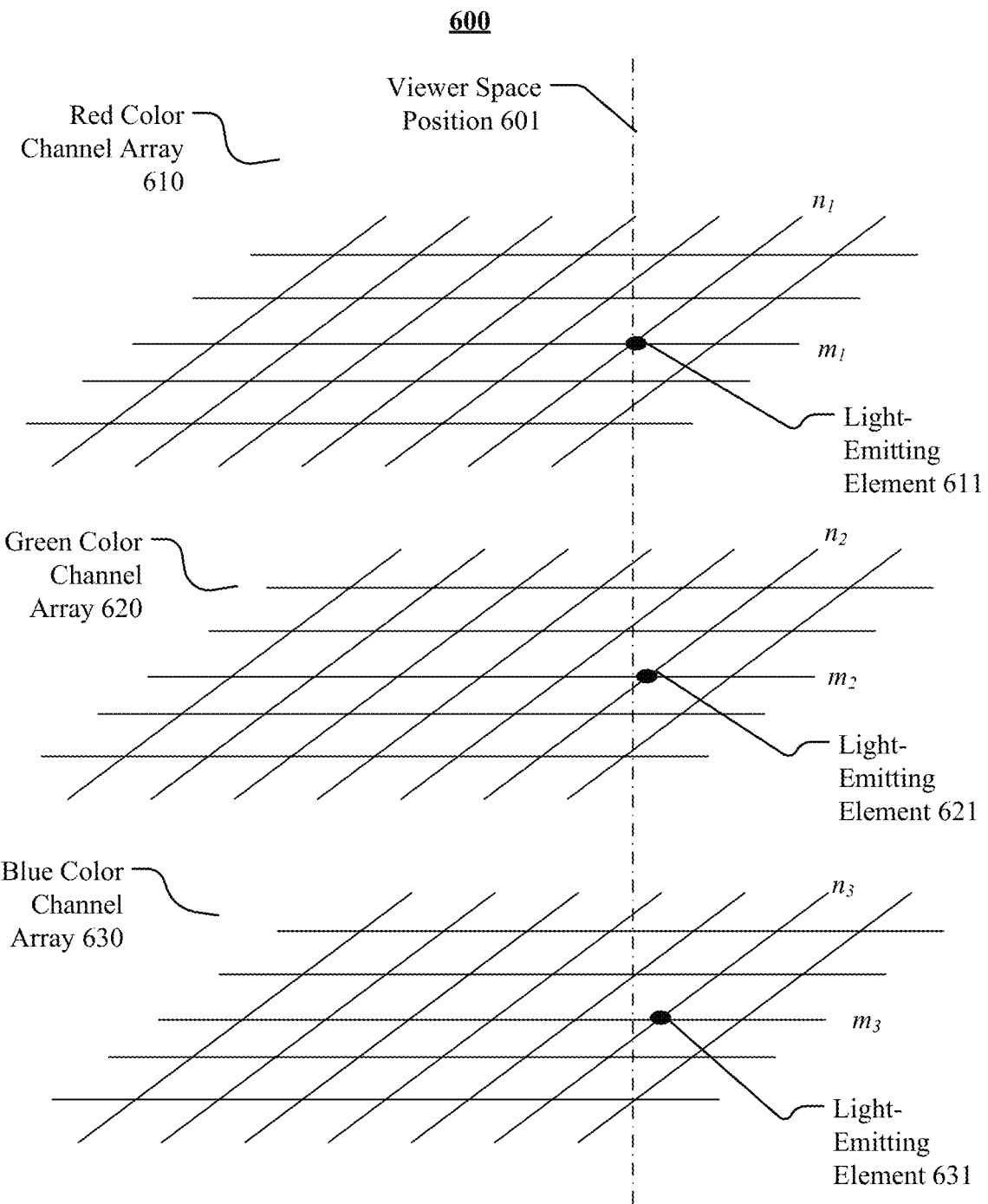
FIG. 6 illustrates an example display having misaligned light-emitting element arrays.

FIG. 6 illustrates an example display having misaligned light-emitting element (e.g., µLED) arrays (e.g., 610, 620, 630). In particular embodiments, the display may have three color channels of RGB with each color channel having an array of light-emitting elements (e.g., a red color channel array 610, a green color channel array 620, and a blue color channel array 630). A light-emitting element of a particular color channel may correspond to a pixel of that particular color channel as perceived by a viewer. The light-emitting elements that are physically close to each other (e.g., within a first threshold distance with respect to each other) may correspond to image pixels that are close to each other (e.g., within a second threshold distance) in a viewer space as perceived by a viewer. However, the light-emitting elements that are physically close to each other may have different relative positions (e.g., row numbers/column numbers) within corresponding light-emitting element arrays. As a result, the pixels that are close to each other (e.g., being within a threshold distance) in the viewer space as perceived by a viewer may correspond to light-emitting elements having different relative positions in respective light-emitting element arrays. In this disclosure, the term "pixel" may refer to an image pixel of a particular color channel or a visual dot in the viewer space as perceived by a viewer. A pixel may correspond to a light-emitting element of the display.

As an example and not by way of limitation, the red light-emitting element 611 of the red color channel which corresponds to a viewer space position 601 may be physically close (e.g., within a threshold distance) to the green light-emitting element 621 and the blue light-emitting element 631. As a result, the light-emitting elements of 611, 621, and 631 may appear to be close to each other (e.g., within a threshold distance) in the viewer space as perceived by a viewer. For example, the light-emitting elements of 611, 621, and 631 may appear to be at a same location in the viewer space as perceived by the viewer. The light-emitting elements of 611, 621, and 631 may display three corresponding color components of a same image pixel. However, due to manufacture imperfectness, the light-emitting elements of 611, 621, and 631 may each have different relative positions (e.g., row number or/and column number) within respective light-emitting element arrays. For example, the light-emitting elements of 611, 621, and 631 may have relative positions of $(m_1, n_1)$, $(m_2, n_2)$, and $(m_3, n_3)$ within respective light-emitting element arrays of 610, 620, and 630, respectively, where $m_i$ and $n_i$ may be the row number and column number indicating corresponding relative positions. In particular embodiments, two or more of relative positions of $(m_1, n_1)$, $(m_2, n_2)$, and $(m_3, n_3)$ may be different from each other. In other words, two or more of $m_1$, $m_2$, and $m_3$ may have different values and two or more of $n_1$, $n_2$, and $n_3$ may have different values. In particular embodiments, the three relative positions of $(m_1, n_1)$, $(m_2, n_2)$, and $(m_3, n_3)$ of the light-emitting elements of 611, 621, and 631 may be the same position.

In particular embodiments, the system may use one or more display compensation algorithms to correct or compensate one or more fault pixels of the display. For example, the system may use one or more mask-based algorithms to correct or hide fault pixels (e.g., dead pixels) of the display. The system may generate a set of three correction masks corresponding to three color channels for correcting a fault pixel of the display. The correction masks may be generated using the methods as described in earlier sections of this disclosure. The generated correction masks may be stored in a database and may be accessed from the database and applied to corresponding pixel regions (e.g., based on a bitmap as described below). However, if the correction masks are applied to pixels of different color channels having the same row/column numbers, the display quality may be negatively affected if the light-emitting elements corresponding to these three pixels have different relative positions within respective light-emitting element arrays. In particular embodiments, to solve this problem, the system may customize the mask-application locations based on the relative positions of the light-emitting elements within respective light-emitting element arrays, as will be described in the later sections of this disclosure.

In particular embodiments, the system may determine the light-emitting element offset or misalignment between red, green, and blue color channels based on one or more images of the light-emitting arrays. The system may identify one or more fault light-emitting elements (e.g., dead light-emitting elements, dimmer or brighter light-emitting elements) of the display. The image pixels corresponding to these fault light-emitting elements may need to be corrected by pixel correction masks. For each fault light-emitting element whose corresponding pixel needs to be corrected, the system may determine which light-emitting elements of other color channels appear to be at the same location to the fault light-emitting element (e.g., within a first threshold distance) and which light-emitting elements appear to within a mask region containing the pixel corresponding to the fault light-emitting element in the viewer space. The system may determine the light-emitting elements that appear to be at the same location and that are within the mask region based on images of the light-emitting element arrays. For example, the system may determine the light-emitting elements that appear to be at the same location and that are within the mask region in the viewer space based on images of the light-emitting element arrays captured with the lenses on top of the light-emitting element arrays. Then, the system may determine the relative positions (e.g., row/column numbers) of these light-emitting elements within respective light-emitting element arrays based on a second image of the light-emitting elements (e.g., with or without the lenses on the light-emitting element arrays).

In particular embodiments, the system may generate a bitmap for each color channel of the display to indicate whether correctio mask need to be applied, where correction masks need be applied, and what type of correction masks need to be applied on the pixels of this particular color channel. In particular embodiments, the bitmap may include an array of 2-bit mask indicators for the pixels of that color channel. Each mask indicator may be associated with a pixel of that color channel and may be or include a 2-bit value to indicate whether or not a mask (and what type of mask) needs be applied to the associated pixel. For example, a mask indicator value of zero may indicate that no mask is needed to be applied to the associated pixel. A mask indicator value of 1 may indicate that a red pixel correction mask needs to be applied to the associate pixel. A mask indicator value of 2 may indicate that a green pixel correction mask needs to be applied to the associated pixel. A mask indicator of value of 3 may indicate that a blue pixel correction mask needs to be applied to the associated pixel. In this disclosure, applying a mask to a pixel may refer to applying a pixel correction mask to a pixel region containing that pixel (e.g., the mask is centered at that pixel). The three bitmaps for three color channels may contain information related to the mask-application locations that are customized to each pixel of each color channel based on the pixel positions in the viewer space and relative positions of corresponding light-emitting element in respective light-emitting arrays. The three bitmaps for three color channels may be stored in a computer storage and may be accessed at run time for applying pixel correction masks to images to be displayed.

In this disclosure, the terms of "red pixel correction mask", "green pixel correction mask", and "blue pixel correction mask" may refer to the masks for correcting a red fault pixel, a green fault pixel, and a blue fault pixel, respectively. However, it is notable that for correcting a fault pixel of a particular color, the system may generate and apply three masks to three color channels, respectively. The correction mask that is applied to a particular color channel may be referred to as "a mask for that color channel". For example, a mask for correcting a red fault pixel to be applied to the green color channel may be referred to as "a red pixel correction mask for the green color channel". As another example, a mask for correcting a blue fault pixel to be applied on the red color channel may be referred to as "a blue pixel correction mask for the red color channel".

As an example and not by way of limitation, assuming the light-emitting element 611 is a fault light-emitting element in the red color channel, the system may identify the light-emitting elements 621 and 631 as the associated with the light-emitting element 611 based on a determination that the three pixels corresponding to the three light-emitting elements 611, 621, and 631 are within a threshold distance to each other in the viewer space as perceived by a viewer. The system may generate a first bitmap including a first mask indicator for the red pixel corresponding to the light-emitting element 611. The first mask indicator may have a value of 1 indicating that a red pixel correction mask (for red color channel) needs to be applied to the associated red pixel (e.g., the red color component of a corresponding image pixel). The system may generate a second bitmap including a second mask indicator for the green pixel corresponding to the light-emitting element 621. The second mask indicator may have a value of 1 indicating a red pixel correction mask (for green color channel) needs to be applied to the green pixel (e.g., the green color component of a corresponding image pixel) corresponding to the light-emitting element 621. The system may generate a third bitmap including a third mask indicator for the blue pixel corresponding to the light-emitting element 631. The third mask indicator may have a value of 1 indicating a red pixel correction mask (for blue color channel) needs to be applied to the blue pixel (e.g., a blue color component of a corresponding image pixel) corresponding to the light-emitting element 631.

As another example and not by way of limitation, assuming the light-emitting element 621 is a fault light-emitting element in the green color channel, the system may identify the light-emitting elements 611 and 631 as the associated with the light-emitting element 621 based on a determination that the three pixels corresponding to the three light-emitting elements 611, 621, and 631 are within a threshold distance in the viewer space as perceived by a viewer. The system may generate a first bitmap including a first mask indicator for the red pixel corresponding to the light-emitting element 611. The first mask indicator may have a value of 2 indicating that a green pixel correction mask (for red color channel) needs to be applied to the associated red pixel (e.g., a red color component of a corresponding image pixel). The system may generate a second bitmap including a second mask indicator for the green pixel corresponding to the light-emitting element 621. The second mask indicator may have a value of 2 indicating a green pixel correction mask (for green color channel) needs to be applied to the green pixel (e.g., a green color component of a corresponding image pixel) corresponding to the light-emitting element 621. The system may generate a third bitmap including a third mask indicator for the blue pixel corresponding to the light-emitting element 631. The third mask indicator may have a value of 2 indicating a green pixel correction mask (for blue color channel) needs to be applied to the blue pixel corresponding to the light-emitting element 631 (e.g., a blue color component of a corresponding image pixel).

As another example and not by way of limitation, assuming the light-emitting element 631 is a fault light-emitting element in the blue color channel, the system may identify the light-emitting elements 611 and 621 as the associated with the light-emitting element 631 based on a determination that the three pixels corresponding to the three light-emitting elements 611, 621, and 631 are within a threshold distance in the viewer space as perceived by a viewer. The system may generate a first bitmap including a first mask indicator for the red pixel corresponding to the light-emitting element 611. The first mask indicator may have a value of 3 indicating that a blue pixel correction mask (for red color channel) needs to be applied to the associated red pixel (e.g., a red color component of a corresponding image). The system may generate a second bitmap including a second mask indicator for the green pixel corresponding to the light-emitting element 621. The second mask indicator may have a value of 3 indicating a blue pixel correction mask (for green color channel) needs to be applied to the green pixel corresponding to the light-emitting element 621 (e.g., a green color component of a corresponding image pixel). The system may generate a third bitmap including a third mask indicator for the blue pixel corresponding to the light-emitting element 631. The third mask indicator may have a value of 3 indicating a blue pixel correction mask (for blue color channel) needs to be applied to the blue pixel corresponding to the light-emitting element 631 (e.g., a blue color component of a corresponding image pixel).

In particular embodiments, the system may identify one or more fault light-emitting elements of the display and generate one or more pixel correction masks for pixels corresponding to the fault light-emitting elements. As an example and not by way of limitation, the system may generate a luminance mask and apply the same luminance mask to all three color channels of the pixels to be corrected. As another example and not by way of limitation, the system may generate a set of three masks corresponding to three color channels for each pixel to be corrected. The set of three masks may be applied to three color channels of the corrected pixel, respectively. In particular embodiments, the pixel correction masks may be generated at run time (e.g., in real-time). In particular embodiments, the correction masks may be pre-generated and stored in a database. To display an image on the display, the system may access mask indicators in the bitmaps of the three color channels and may determine, for each pixel of the image, whether to apply a correction mask and what type of correction mask to apply, based on the accessed mask indicators from the bitmaps.

As an example and not by way of limitation, assuming the light-emitting element 611 is a fault light-emitting element in the red color channel, the system may generate a set of three masks corresponding to three color channels for correcting the red pixel corresponding to the fault light-emitting element 611. The set of three masks may include a red pixel correction mask for the red color channel, a red pixel correction mask for the green color channel, and a red pixel correction mask for the blue color channel. The red pixel correction masks may be stored in a database. At run time, the system may access a mask indicator from a bitmap of a color channel and determine whether a mask needs to be applied to a pixel associated with that mask indicator. For example, for a pixel having an associated mask indicator value of 0, the system may determine that there is no need to apply a mask to that pixel. As another example, for the pixel corresponding to the fault light-emitting element 611, the system may determine that a red pixel correction mask (for red color channel) needs to be applied based on a determination that the mask indicator associated with that pixel has a value of 1. Similarly, for the pixel corresponding to the light-emitting element 621, the system may determine that a red pixel correction mask (for green color channel) needs to be applied based on a determination that the mask indicator associated with that pixel has a value of 1. Similarly, for the pixel corresponding to the light-emitting element 631, the system may determine that a red pixel correction mask (for blue color channel) needs to be applied based on a determination that the mask indicator associated with that pixel has a value of 1. The system may access the set of three masks including a red pixel correction mask for red color channel, a red pixel correction mask for green color channel, and a red pixel correction mask for blue color channel. The system may apply these three masks to the pixels corresponding to the light-emitting elements of 611, 621, and 631, respectively. The three masks may be applied to respective pixels simultaneously or in any suitable order.

As another example and not by way of limitation, assuming the light-emitting element 621 is a fault light-emitting element in the green color channel, the system may generate a set of three masks corresponding to three color channels for correcting the green pixel associated with the fault light-emitting element 621. The set of three masks may include a green pixel correction mask for the red color channel, a green pixel correction mask for the green color channel, and a green pixel correction mask for the blue color channel. The green pixel correction masks may be stored in a database. At run time, the system may access a mask indicator from a bitmap of a color channel and determine whether a mask needs to be applied to a pixel associated with that mask indicator. For example, for a pixel having an associated mask indicator value of 0, the system may determine that there is no need to apply a mask to that pixel. As another example, for the pixel corresponding to the fault light-emitting element 621, the system may determine that a green pixel correction mask (for green color channel) needs to be applied based on a determination that the mask indicator associated with that pixel has a value of 2. Similarly, for the pixel corresponding to the light-emitting element 611, the system may determine that a green pixel correction mask (for red color channel) needs to be applied based on a determination that the mask indicator associated with that pixel has a value of 2. Similarly, for the pixel corresponding to the light-emitting element 631, the system may determine that a green pixel correction mask (for blue color channel) needs to be applied based on a determination that the mask indicator associated with that pixel has a value of 2. The system may access the set of three masks including a green pixel correction mask for red color channel, a green pixel correction mask for green color channel, and a green pixel correction mask for blue color channel. The system may apply these three masks to the pixels corresponding to the light-emitting elements of 611, 621, and 631, respectively. The three masks may be applied to respective pixels simultaneously or in any suitable order.

As another example and not by way of limitation, assuming the light-emitting element 631 is a fault light-emitting element in the blue color channel, the system may generate a set of three masks corresponding to three color channels for correcting the blue pixel associated with the fault light-emitting element 631. The set of three masks may include a blue pixel correction mask for the red color channel, a blue pixel correction mask for the green color channel, and a blue pixel correction mask for the blue color channel. The blue pixel correction masks may be stored in a database. At run time, the system may access a mask indicator from a bitmap of a color channel and determine whether a mask needs to be applied to a pixel associated with that mask indicator. For example, for a pixel having an associated mask indicator value of 0, the system may determine that there is no need to apply a mask to that pixel. As another example, for the pixel corresponding to the fault light-emitting element 631, the system may determine that a blue pixel correction mask (for blue color channel) needs to be applied based on a determination that the mask indicator associated with that pixel has a value of 3. Similarly, for the pixel corresponding to the light-emitting element 611, the system may determine that a blue pixel correction mask (for red color channel) needs to be applied based on a determination that the mask indicator associated with that pixel has a value of 3. Similarly, for the pixel corresponding to the light-emitting element 621, the system may determine that a blue pixel correction mask (for green color channel) needs to be applied based on a determination that the mask indicator associated with that pixel has a value of 3. The system may access the set of three masks including a blue pixel correction mask for red color channel, a blue pixel correction mask for green color channel, and a blue pixel correction mask for blue color channel. The system may apply these three masks to the pixels corresponding to the light-emitting elements of 611, 621, and 631, respectively. The three masks may be applied to respective pixels simultaneously or in any suitable order.

Figure 7A:
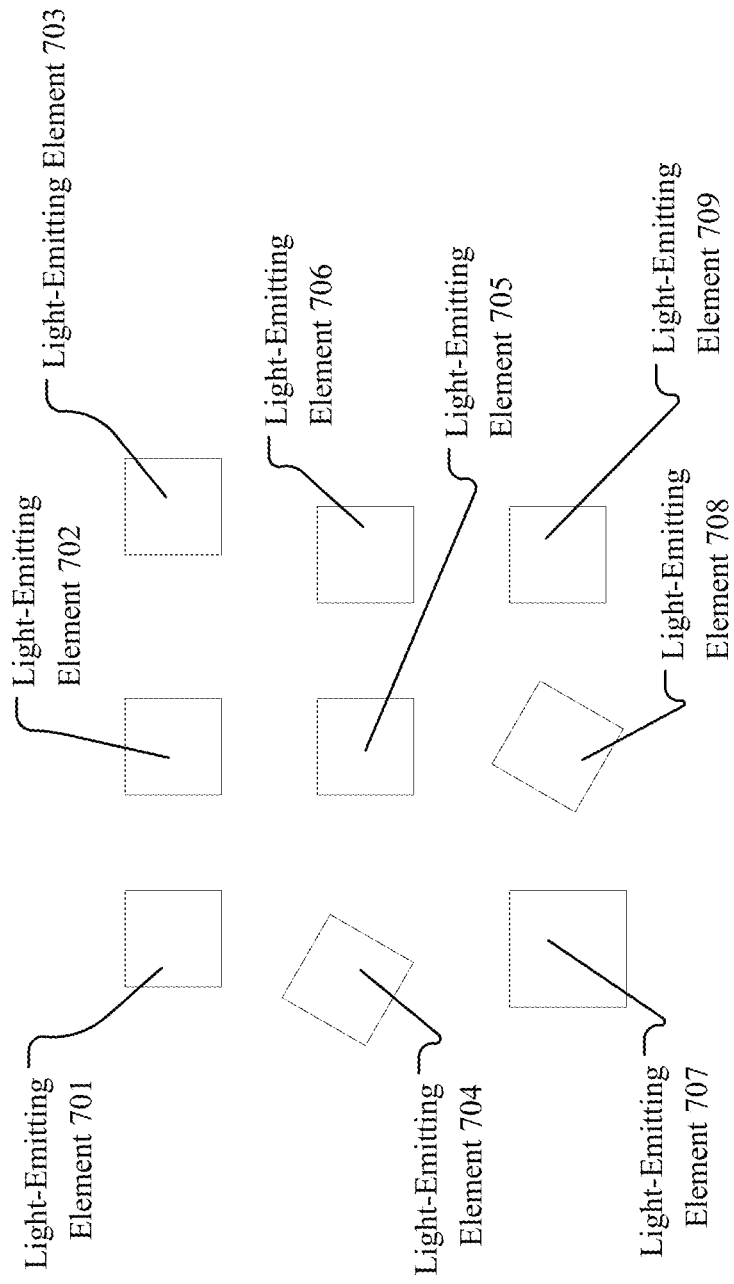
FIG. 7A illustrates an example light-emitting element array having non-uniform light-emitting elements.

FIG. 7A illustrates an example light-emitting element array 700A having non-uniform light-emitting elements. In particular embodiments, the display may have non-uniform light-emitting elements due to manufacture imperfectness. For example, the light-emitting element array 700A may have a light-emitting element 703 having a position slightly offset with respect to its ideal position. The light-emitting element 703 may have irregular distances to adjacent light-emitting elements (e.g., 702 and 706) that is different from an ideal distance (e.g., a design distance or an average distance). As another example, the light-emitting element 708 may have a rotation angle that is different from the aligned light-emitting elements (e.g., 701, 702, 706). As yet another example, the light-emitting element 704 may have a rotation an abnormal rotation angle and irregular distances to adjacent light-emitting elements. As yet another example, the light-emitting element 707 may have an irregular size that is different from an ideal light-emitting element size (e.g., a design size or an average size).

In particular embodiments, the pixel non-uniformity factors (e.g., irregular distances, abnormal rotation angles, irregular sizes or shapes) may has influence on the visual effect of the pixel compensation results using the mask-based compensation algorithms. For example, assuming that the light-emitting element 705 is a fault light-emitting element and its corresponding pixel needs to be compensated, the light-emitting element 706 having a larger element size may have a greater influence on the visual effect of a compensated pixel (e.g., 705) because the light-emitting element 706 may emit more light than other light-emitting elements. As another example, the light-emitting element 703 may have less influence on the visual effect of the compensated pixel because the light-emitting element 703 is farer from the fault light-emitting element 705. As yet another example, the rotation angle of the light-emitting elements (e.g., 704, 708) may change the degree of influence of those light-emitting elements on the visual effect of the compensated pixel. As a result, if the mask values of the pixel compensation algorithms are determined based on an assumption of uniform light-emitting elements, the visual effect of the compensated pixel may not be optimal.

Figure 7B:
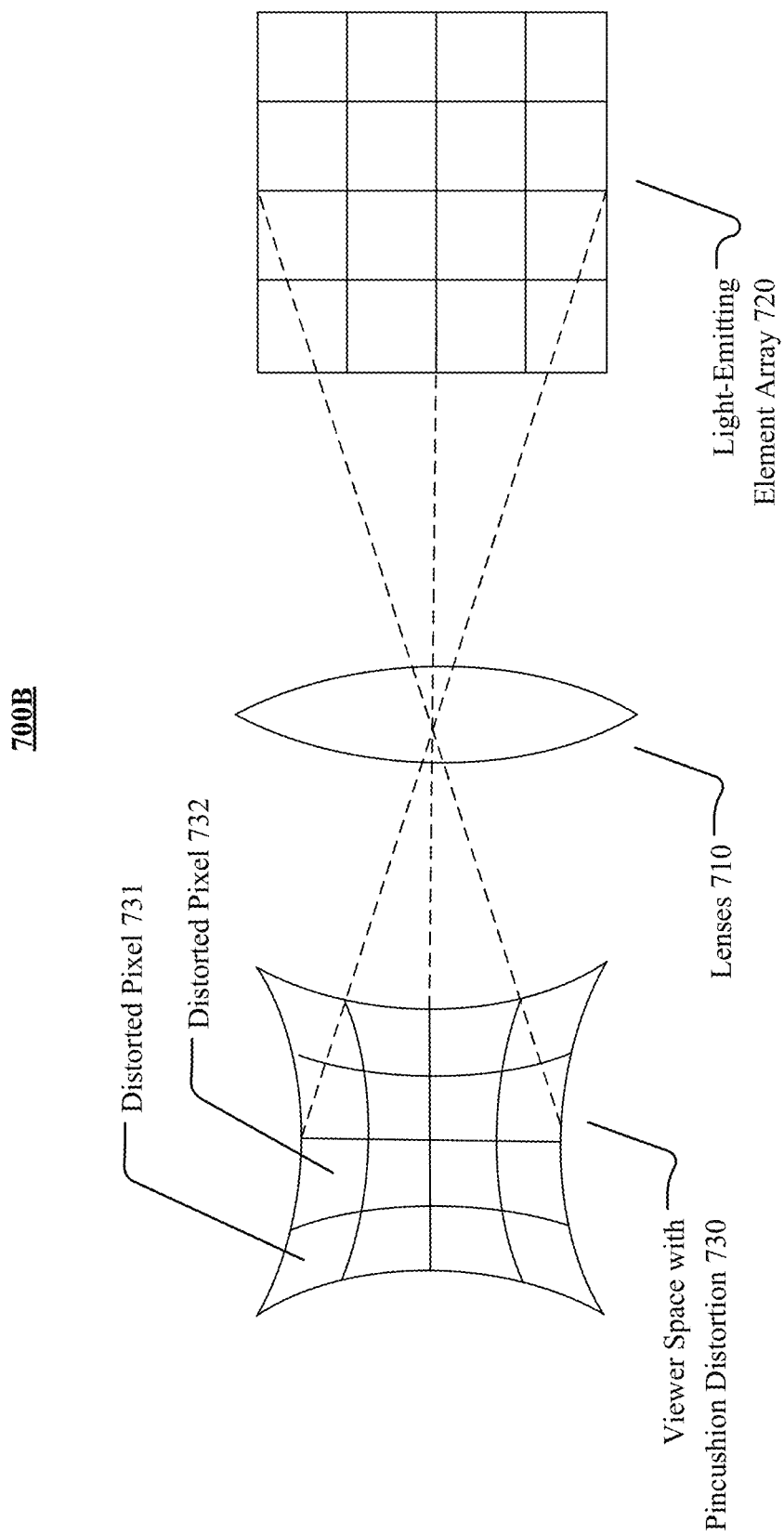
FIG. 7B illustrates an example pincushion distortion caused by lenses.

FIG. 7B illustrates an example pincushion distortion 700B caused by lenses. In particular embodiments, the system may use one or more lenses to map the light-emitting element arrays to a viewer space which may have pincushion distortion. As an example and not by way of limitation, the light-emitting element array 720 may be mapped by the lens 710 to a viewer space with pincushion distortion 730. As a result, the pixels in the viewer space may have different sizes, shapes, and angular distance (to adjacent pixels) based on their locations within the viewer space. For example, a pixel close to the center of the viewer space 730 may have less distortion in shape than a pixel at an edge of the viewer space 730. As another example, two adjacent pixels at edge of the viewer space 730 may have a longer angular distance than two adjacent pixels at the center area of the viewer space 730. As yet another example, a pixel at the center area of the viewer space 730 may have a different size and shape from a pixel at edge of the viewer space. In particular embodiments, these non-uniformity factors caused by optical distortions (e.g., non-uniform pixel sizes, non-uniform pixel shapes, non-uniform pixel angular distances) may has influence on the visual effect of the pixel compensation results of the mask-based compensation algorithms. If the pixel compensation algorithms determine the mask values with an assumption of uniform pixels (e.g., uniform sizes, shapes, and angular distance), the visual effect of the compensated pixel may not be optimal.

In particular embodiments, the system may generate one or more masks for correcting or compensating one or more fault pixels of the display. To address the non-uniformity factors in the viewer space (e.g., non-uniform pixel sizes, non-uniform pixels shapes, non-uniform pixel angular distances), the system may customize the mask values based on one or more of the non-uniformity factors. For example, the system may determine one or more factors related to the pixel non-uniformity (e.g., pixels sizes, shapes, locations, angular distances) of the pixels based on one or more images of the light-emitting element arrays. The images of the light-emitting element arrays may be captured in the viewer space from a viewer's perspective (e.g., captured with the optical lenses on the light-emitting element arrays). The mask values of a mask covering a pixel region may be customized based on the pixel sizes, pixel shapes, pixels locations in the viewer space, or pixel angular distances to adjacent pixels in the viewer space. The masks with customized mask values, once applied, may provide better visual effect for the compensated fault pixels.

In particular embodiments, the system may pre-generate pixel correction masks with customized mask values based on the non-uniformity factors of the pixels in the viewer space and in the light-emitting element array space. The pre-generated pixel correction masks may be stored in a database and may be accessed and applied to corresponding pixels based on associated bitmap information. The pre-generated pixel correction mask may be generated using one or more functions having the non-uniformity factors as input parameters. In particular embodiments, the input parameters of these functions may include, for example, but are not limited to, fault pixel positions or location in the viewer space, fault pixel shapes in the viewer space, fault pixel sizes in the viewer space, fault pixel angular distances to surrounding pixels in the viewer space, color channels, pixel shapes, sizes, and interval distances of the pixels in the same visual location, pixel shapes, sizes, and interval distances of associated pixels (e.g., within a mask region in the viewer space) of other color channels, etc. In particular embodiments, the input parameters may further include the non-uniformity factors of light-emitting elements including, for example, but not limited to, a relative position (e.g., row/column numbers) of fault light-emitting element within a corresponding light-emitting array, relative positions of associated light-emitting elements within respective light-emitting arrays, light-emitting element sizes of the fault and associated light-emitting elements (of the same and different color channels), light-emitting element shapes of the fault and associated light-emitting elements (of the same and different color channels), light-emitting element distances, light-emitting element rotation angles of the fault and associated light-emitting elements (of the same and different color channels), etc.

In particular embodiments, the system may generate pixel correction masks with customized mask values at run time (e.g., in real-time). The system may determine or access the non-uniformity factors of the pixels in the viewer space and the non-uniformity factors of the light-emitting elements and generate the pixel correction masks based on these non-uniformity factor using one or more functions. The pixel correction masks may be generated in response to a determination that one or more pixel correction masks are needed based on information in associated bitmaps. The pixel correction masks may be applied to pixels of a color channel based on information of the associated bitmap. As an example and not by way of limitation, the system may generate ring-shape masks with customized mask values based on the locations of the compensated pixels within the mask region in the viewer space. The system may generate a set of 5×5 pixel correction masks corresponding to a ring shape as determined based on the fault pixel location and its distances to surrounding pixels. The correction masks may be calculated directly based on a number of input parameters (e.g., a dead pixel location in the viewer space, a color channel, row/column numbers of associated pixels of other color channels, etc.) using a firmware computation module at runtime. The generated pixel correction masks may be applied to corresponding pixel regions based on location information accessed from associated bitmaps.

In particular embodiments, the system may pre-generate correction masks for a number of locations corresponding to a mesh grid in the viewer space and store the generated correction masks in a database. For example, the system may pre-generate a set of three correction masks for each grid point of a mesh grid in the viewer space. At runtime, the system may determine four sets of correction masks (e.g., each set including three masks for RGB color channels) associated with a fault pixel location and interpolate the four corresponding correction masks of the same color channel to generate the respective correction masks for RGB color channels for the fault pixel position. After the set of corrections masks being generated, the system may apply the correction masks to RGB color channels on the pixels of the same visual location with respect to the fault pixel and as indicated by the bitmap. By generating and applying the correction masks based on the location in the viewer space, the system may provide better pixel correction results in spite of the pixel misalignment and optical distortion.

Figure 8:
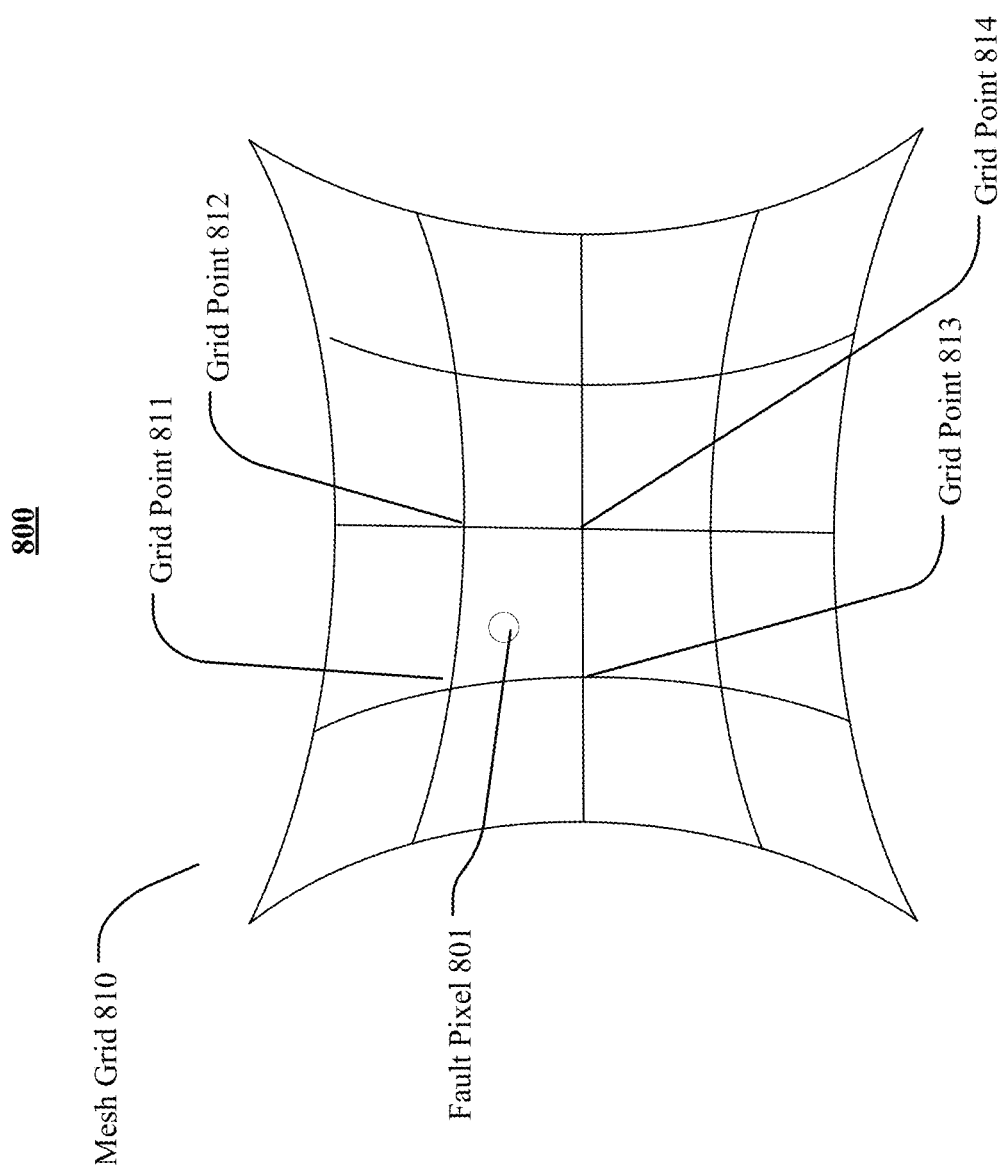
FIG. 8 illustrates an example mesh in the viewer space for generating customized correction masks.

FIG. 8 illustrates an example mesh grid 800 in the viewer space for generating customized correction masks. As an example and not by way of limitation, the system may pre-generate correction masks for a number of locations corresponding to a mesh grid 810 in the viewer space. For example, the system may pre-generate a set of three correction masks for each grid point of the mesh grid 810 in the viewer space. The pre-generated correction masks may be stored in a database which is accessible at run time. At runtime, the system may identify a fault pixel 801 which falls in a mesh area as defined by the grid points of 811, 812, 813, and 814. The system may access the pre-generated pixel correction masks corresponding to the four locations of 811, 812, 813, and 814 and determine the customized pixel correction masks for the fault pixel 801 based on the interpolation on the pre-generated pixel correction masks. For example, the pixel correction mask for the red color channel may be determined based on interpolation on the four pixel correction masks corresponding to the grid points of 811, 812, 813, and 814 for the red color channel. The pixel correction mask for green color channel may be determined based on interpolation on the four pixel correction masks corresponding to the grid points of 811, 812, 813, and 814 for the green color channel. The pixel correction mask for blue color channel may be determined based on interpolation on the four pixel correction masks corresponding to the grid points of 811, 812, 813, and 814 for the blue color channel. In particular embodiments, the interpolation may be based on the relative position of the fault pixel 801 with respect to the four grid points of 811, 812, 813, and 814 of the mesh grid 810. For example, the interpolation may be based on a weighted interpolation with four weight values corresponding to the distance between the fault pixel 801 to the respective four grid points of 811, 812, 813, and 814. As a result, the generated pixel correction masks for the fault pixel 801 may be customized to the location of the fault pixel 801 within the viewer space. After the set of corrections masks for the fault pixel 801 are generated, the system may identify the associated pixels (e.g., of the same visual location in the viewer space) of other color channels based on the associated bitmaps. Then, the system may apply the set of three correction masks to RGB color channels on the pixels at the same visual location (e.g., within a threshold distance) with respect to the fault pixel 801. As a result, the system may provide better pixel correction results by customizing the correction masks based on the fault pixel location within the viewer space.

In particular embodiments, the light-emitting elements of the AR/VR display may have non-uniform capability for emitting lights. For example, the light-emitting elements of the display may emit light in different intensity ranges with different maximum light intensity. Some light-emitting elements of the display may have a relative higher maximum light intensity than other light-emitting elements of the display. As a result, different light-emitting elements of the display may emit light with different luminance levels even if they are provided the same pixel values (e.g., same voltage and current levels). When an image is displayed by the light-emitting elements having non-uniform light emitting capability, the displayed image may be distorted and may appear different from what it is intended to be.

In particular embodiments, the system may use a matrix of scaling factors to scale pixel values of the image to be displayed to compensate light intensity non-uniformity. In particular embodiments, the system may determine (e.g., using an optical measurement system or a computer vision system) the quantified light intensity non-uniformity (e.g., during manufacture or calibration stages of the system) of the light-emitting element arrays. For example, the system may determine a light emitting coefficient for each pixel of the display. In particular embodiments, the light emitting coefficient may be a normalized maximum light intensity with respect to the brightest pixel (i.e., the pixel having the highest maximum light intensity level). For example, a light emitting coefficient of 1 may correspond to the brightest pixel with the greatest maximum light intensity. A light emitting coefficient of 0.8 may correspond to 80% emitted light intensity with respect to the brightest pixel. Then, the system may calculate a light intensity scaling factor for each pixel based on the light emitting coefficient value of that pixel. To allow all pixels of the display to emit light in the same intensity range, the system may calculate the light intensity scaling factor values with respect to the dimmest pixel (i.e., the pixel having the lowest maximum light intensity). Given $p_0$ as the light emitting coefficient of the dimmest pixel and $p_x$ as the light emitting coefficient of a current pixel, the light intensity scaling factor of that pixel may be determined by dividing $p_0$ by $p_x$. For example, assuming the dimmest pixel has a light emitting coefficient value of 0.6, the pixels having light emitting coefficients of 0.9, 0.8, 0.7, and 0.6 may have the light intensity scaling factor values of 0.67, 0.75, 0.86, and 1, respectively. The system may repeat this calculation and determine a light intensity scaling factor for each pixel of each color channels of the display. The calculated light intensity scaling factors may be stored in a pixel correction matrix corresponding to a color channel. The system may generate three pixel correction matrices for RGB color channels of the display, respectively. The matrices may be stored into the memory storage of the system. At run time, the system may access the scaling factors from the pixel correction matrices and scale the pixel values of the image to be displayed based on the respective scaling factors. The system may apply the three light intensity correction matrices to RGB color channels of the image, respectively. The pixel values of the image after being scaled by the scaling factors may be uniform in the same light intensity range corresponding to the dimmest pixel of the display. In other words, the pixel values for the pixels with higher maximum light intensity than the dimmest pixel may be scaled down to match the dimmest pixel. As a result, the image after being modified by the pixel correction matrices may eliminate the light intensity non-uniformity and may provide better displayed quality (e.g., displayed image being closer to the original image).

Figure 9:
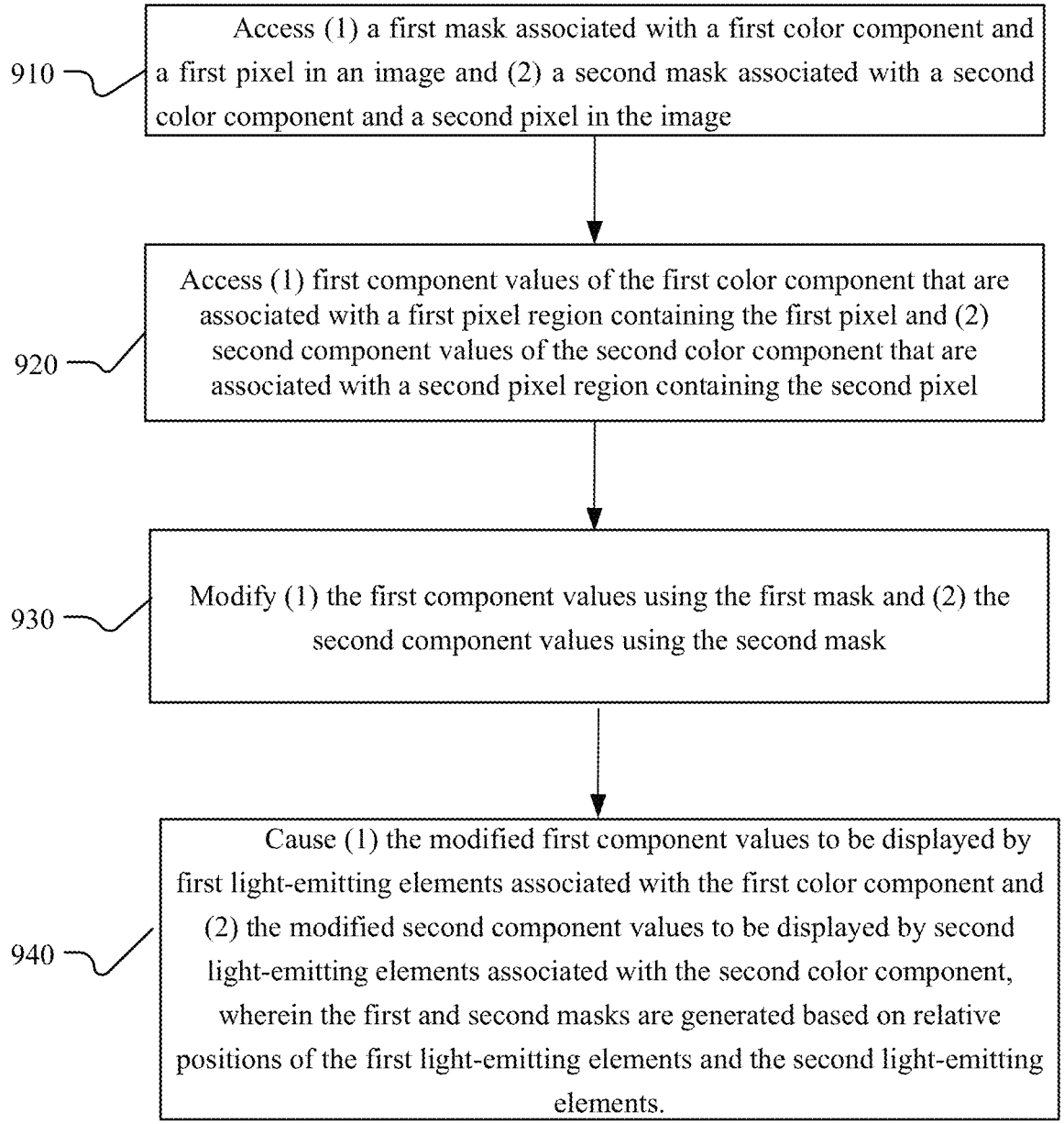
FIG. 9 illustrates an example method for compensating display non-uniformities.

FIG. 9 illustrates an example method for compensating display non-uniformities. The method may begin at step 910, wherein a computing system may access (1) a first mask associated with a first color component and a first pixel in an image and (2) a second mask associated with a second color component and a second pixel in the image. At step 920, the system may access (1) first component values of the first color component that are associated with a first pixel region containing the first pixel and (2) second component values of the second color component that are associated with a second pixel region containing the second pixel. At step 930, the system may modify (1) the first component values using the first mask and (2) the second component values using the second mask. At step 940, the system may cause (1) the modified first component values to be displayed by first light-emitting elements associated with the first color component and (2) the modified second component values to be displayed by second light-emitting elements associated with the second color component. The first and second masks may be generated based on relative positions of the first light-emitting elements and the second light-emitting elements.

In particular embodiments, the first pixel may correspond to a fault light-emitting element of a display and the fault light-emitting element may emit light with a light intensity different from a non-fault light-emitting element. In particular embodiments, the system may determine that the first pixel is associated with the second pixel based on a determination that a first light-emitting element corresponding to the first pixel and a second light-emitting element corresponding to the second pixel are within a threshold distance to each other in a viewer space as perceived by a viewer. In particular embodiments, the viewer space may be a space as perceived by the viewer through one or more lenses on light-emitting element arrays. In particular embodiments, the determination that the first light-emitting element corresponding to the first pixel and the second light-emitting element corresponding to the second pixel are within the threshold distance to each other in the viewer space may be based on a light-emitting element array image, which is captured with the one or more lenses on the light-emitting element arrays.

In particular embodiments, the first light-emitting element may be associated with a first color channel and the second light-emitting element may be associated with a second color channel. The first light-emitting element may correspond to the first pixel has a first relative position within a first pixel array of a first color channel. The second light-emitting channel may correspond to the second pixel has a second relative position within a second pixel array of a second color channel. The first relative position of the first light-emitting element in the first pixel array may be different from the second relative position of the second light-emitting element in the second pixel array.

In particular embodiments, the system may access a first mask indicator value for the first pixel from a first bitmap. The first mask indicator value may indicate that the first mask is to be applied on the first pixel. The system may access a second mask indicator value for the second pixel from a second bitmap. The second mask indicator value may indicate that the second mask is to be applied on the second pixel. In particular embodiments, the first bitmap and the second bitmap may be selected from a set of three bitmaps for three color channels. The set of three bitmaps may map a plurality of masks to corresponding pixels. In particular embodiments, the mask values for the dead pixels may be combined into the non-uniformity bitmap.

In particular embodiments, the first mask and the second mask may each include an array of scaling values for scaling pixel values of an image region. The array of scaling values of the first mask may be customized based on a position of a light-emitting element corresponding to the first pixel. The position of the light-emitting element corresponding to the first pixel may be in a viewer space. In particular embodiments, the first mask may have a ring-shape that is determined based on the position of the lighting-emitting element corresponding to the first pixel in the viewer space and angular distances of that lighting-emitting element to surrounding light-emitting elements in the viewer space. In particular embodiments, the first mask may have a size that is determined based on the position of the light-emitting element corresponding the first pixel in the viewer space.

In particular embodiments, the first mask and the second mask may be generated at runtime based on a number of parameters including the position of the light-emitting element corresponding to the first pixel in the viewer space and an associated color channel. In particular embodiments, the system may generate a number of masks for a number of locations corresponding to a mesh grid in the viewer space. Each grid intersection of the mesh grid may correspond to a set of three masks for three color channels. The system may store the number of mask and the mesh grid in a computer storage. In particular embodiments, the system may determine that the position of the light-emitting element corresponding to the first pixel in the viewer space falls within a grid region of the mesh grid. The system may access four masks associated with four corners of the grid region from the computer storage. The first mask may be generated by interpolating the four masks associated with the grid region accessed from the computer storage. In particular embodiments, the first light-emitting elements may have different visual sizes and different angular distances to surrounding light-emitting elements in a viewer space due to distortion of the lenses. In particular embodiments, the first light-emitting elements may have different rotation angles in a pixel array space.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for compensating display non-uniformities including the particular steps of the method of FIG. 9, this disclosure contemplates any suitable method for compensating display non-uniformities including any suitable steps, which may include all, some, or none of the steps of the method of FIG.

9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
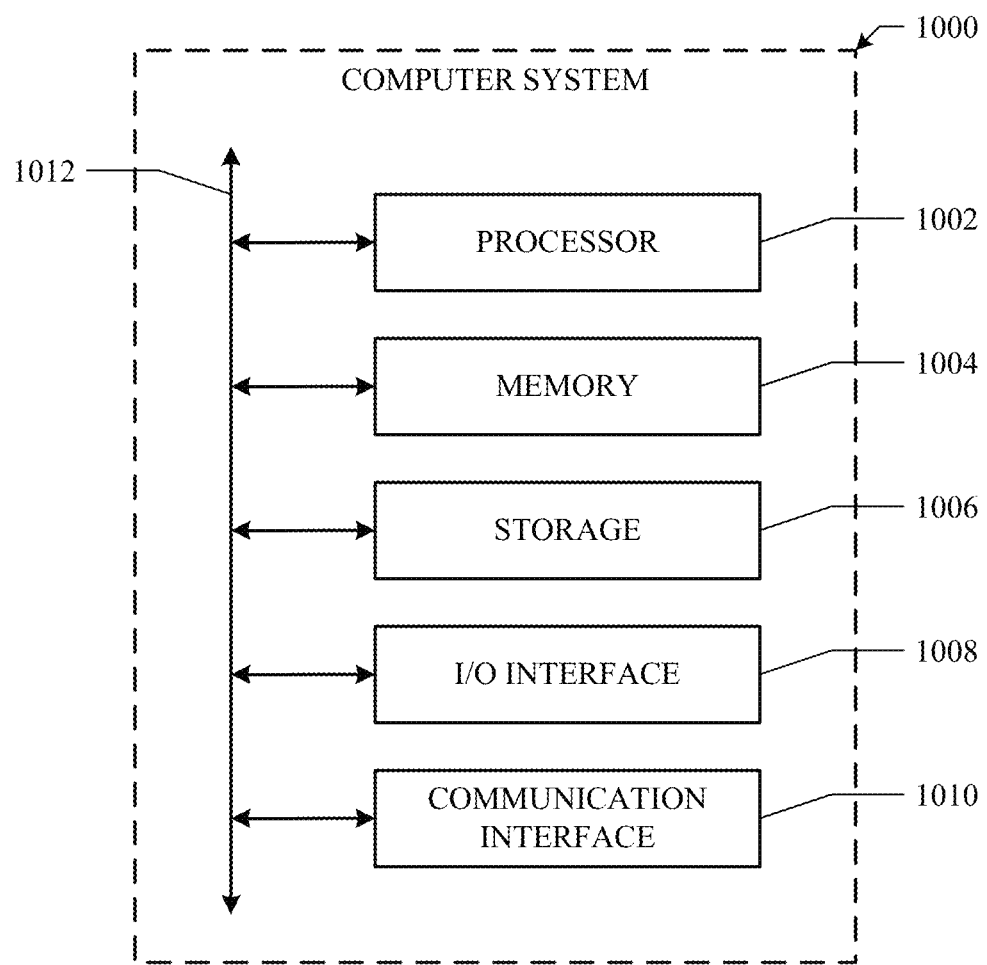
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for compensating for display non-uniformities, comprising, by a computing system:
   accessing (1) a first mask associated with a first color component and a first pixel in an image, the first mark comprising a plurality of first scaling factors, and (2) a second mask associated with a second color component and a second pixel in the image, the second mask comprising a plurality of second scaling factors;
   accessing (1) first component values of the first color component that are associated with a first pixel region containing the first pixel and (2) second component values of the second color component that are associated with a second pixel region containing the second pixel;
   modifying (1) the first component values using the plurality of first scaling factors of the first mask and (2) the second component values using the plurality of second scaling factors of the second mask; and
   causing (1) the modified first component values to be displayed by first light-emitting elements associated with the first color component and (2) the modified second component values to be displayed by second light-emitting elements associated with the second color component;
   wherein the first and second masks are generated based on relative positions of the first light-emitting elements and the second light-emitting elements.

2. The method of claim 1, wherein the first pixel corresponds to a fault light-emitting element of a display, and wherein the fault light-emitting element emits light with a light intensity different from a non-fault light-emitting element.

3. The method of claim 1, further comprising:
   determining that the first pixel is associated with the second pixel based on a determination that a first light-emitting element corresponding to the first pixel and a second light-emitting element corresponding to the second pixel are within a threshold distance to each other in a viewer space as perceived by a viewer.

4. The method of claim 3, wherein the viewer space is perceived by the viewer through one or more lenses on light-emitting element arrays.

5. The method of claim 4, wherein the determination that the first light-emitting element corresponding to the first pixel and the second light-emitting element corresponding to the second pixel are within the threshold distance to each other in the viewer space is based on a light-emitting element array image, and wherein the light-emitting element array image is captured with the one or more lenses on the light-emitting element arrays.

6. The method of claim 3, wherein the first light-emitting element is associated with a first color channel and the second light-emitting element is associated with a second color channel.

7. The method of claim 3, wherein the first light-emitting element corresponding to the first pixel has a first relative position within a first pixel array of a first color channel, wherein the second light-emitting channel corresponding to the second pixel has a second relative position within a second pixel array of a second color channel, and wherein the first relative position of the first light-emitting element in the first pixel array is different from the second relative position of the second light-emitting element in the second pixel array.

8. The method of claim 1, further comprising:
   accessing a first mask indicator value for the first pixel from a first bitmap, wherein the first mask indicator value indicates that the first mask is to be applied on the first pixel; and
   accessing a second mask indicator value for the second pixel from a second bitmap, wherein the second mask indicator value indicates that the second mask is to be applied on the second pixel.

9. The method of claim 8, wherein the first bitmap and the second bitmap are selected from a set of three bitmaps for three color channels, and wherein the set of three bitmaps map a plurality of masks to corresponding pixels.

10. The method of claim 1, wherein the plurality of first scaling values of the first mask is customized based on a position of a first light-emitting element corresponding to the first pixel, and wherein the position of the first light-emitting element corresponding to the first pixel is in a viewer space.

11. The method of claim 10, wherein the first mask has a ring-shape that is determined based on the position of the first lighting-emitting element corresponding to the first pixel in the viewer space and angular distances of that first lighting-emitting element to surrounding light-emitting elements in the viewer space.

12. The method of claim 10, wherein the first mask has a size that is determined based on the position of the first light-emitting element corresponding the first pixel in the viewer space.

13. The method of claim 10, wherein the first mask and the second mask are generated at runtime based on a plurality of parameters comprising the position of the first light-emitting element corresponding to the first pixel in the viewer space and an associated color channel.

14. The method of claim 10, further comprising:
   generating a plurality of masks for a plurality of locations corresponding to a mesh grid in the viewer space, wherein each grid intersection corresponds to a set of three masks for three color channels; and
   storing the plurality of masks and the mesh grid in a data storage.

15. The method of claim 14, further comprising:
   determining that the position of the first light-emitting element corresponding to the first pixel in the viewer space falls within a grid region of the mesh grid; and
   accessing four masks associated with four corners of the grid region from the data storage, wherein the first mask is generated by interpolating the four masks associated with the four corners of the grid region accessed from the data storage.

16. The method of claim 1, wherein the first light-emitting elements have different visual sizes and different angular distances in a viewer space due to distortion of a plurality of lenses.

17. The method of claim 16, wherein the first light-emitting elements have different rotation angles in a pixel array space.

18. One or more computer-readable non-transitory storage media embodying software that is operable when executed to:
- access (1) a first mask associated with a first color component and a first pixel in an image, the first mask comprising a plurality of first scaling factors, and (2) a second mask associated with a second color component and a second pixel in the image, the second mask comprising a plurality of second scaling factors;
- access (1) first component values of the first color component that are associated with a first pixel region containing the first pixel and (2) second component values of the second color component that are associated with a second pixel region containing the second pixel;
- modify (1) the first component values using the plurality of first scaling factors of the first mask and (2) the second component values using the plurality of second scaling factors of the second mask; and
- cause (1) the modified first component values to be displayed by first light-emitting elements associated with the first color component and (2) the modified second component values to be displayed by second light-emitting elements associated with the second color component;
- wherein the first and second masks are generated based on relative positions of the first light-emitting elements and the second light-emitting elements.

19. A system comprising:
- one or more non-transitory computer-readable storage media embodying instructions; and
- one or more processors coupled to the storage media and operable to execute the instructions to:
  - access (1) a first mask associated with a first color component and a first pixel in an image, the first mask comprising a plurality of first scaling factors, and (2) a second mask associated with a second color component and a second pixel in the image, the second mask comprising a plurality of second scaling factors;
  - access (1) first component values of the first color component that are associated with a first pixel region containing the first pixel and (2) second component values of the second color component that are associated with a second pixel region containing the second pixel;
  - modify (1) the first component values using the plurality of first scaling factors of the first mask and (2) the second component values using the plurality of second scaling factors of the second mask; and
  - cause (1) the modified first component values to be displayed by first light-emitting elements associated with the first color component and (2) the modified second component values to be displayed by second light-emitting elements associated with the second color component;
  - wherein the first and second masks are generated based on relative positions of the first light-emitting elements and the second light-emitting elements.

* * * * *